US012183177B2

(12) United States Patent

Nakabayashi

(10) Patent No.: US 12,183,177 B2
(45) Date of Patent: Dec. 31, 2024

(54) EMERGENCY RESPONDING METHOD, SAFETY CONFIRMATION SYSTEM, MANAGEMENT DEVICE, SPACE SECTION, AND METHOD FOR CONTROLLING MANAGEMENT DEVICE

(71) Applicants: SEKISUI HOUSE, LTD., Osaka (JP); E-SOLUTIONS, INC., Tokyo (JP)

(72) Inventor: Yoshiki Nakabayashi, Osaka (JP)

(73) Assignees: SEKISUI HOUSE, LTD., Osaka (JP); E-SOLUTIONS, INC., Tokyo (JP)

( * ) Notice: Subject to any disclaimer, the term of this patent is extended or adjusted under 35 U.S.C. 154(b) by 123 days.

(21) Appl. No.: 17/621,620

(22) PCT Filed: Jun. 26, 2020

(86) PCT No.: PCT/JP2020/025256
§ 371 (c)(1),
(2) Date: Dec. 21, 2021

(87) PCT Pub. No.: WO2021/002293
PCT Pub. Date: Jan. 7, 2021

(65) Prior Publication Data

US 2022/0358822 A1 Nov. 10, 2022

(30) Foreign Application Priority Data

Jul. 1, 2019 (JP) ................................ 2019-123116

(51) Int. Cl.
*G08B 21/02* (2006.01)
*G07C 9/00* (2020.01)

(52) U.S. Cl.
CPC ......... *G08B 21/02* (2013.01); *G07C 9/00182* (2013.01)

(58) Field of Classification Search
CPC .. G08B 21/02; G08B 21/0492; G08B 25/001; G08B 21/0423; G08B 21/0453; G08B 21/043; G08B 25/04; G07C 9/00182
See application file for complete search history.

(56) References Cited

U.S. PATENT DOCUMENTS 3,879,709 A * 4/1975 Yukawa ............ G07C 9/00182 340/13.24
5,441,047 A * 8/1995 David ................. A61B 5/6887 348/93

(Continued)

FOREIGN PATENT DOCUMENTS

JP 7-26547 5/1995
JP 2001-275509 10/2001

(Continued)

OTHER PUBLICATIONS

International Search Report for PCT/JP2020/025256 and its English translation, dated Sep. 24, 2020.

(Continued)

*Primary Examiner* — Curtis J King
(74) *Attorney, Agent, or Firm* — Casimir Jones, S.C.; Tanya A. Arenson

(57) ABSTRACT

Provided is a safety checking system that can accurately determine an abnormality of a user or a rearing animal using a lockable space section and can respond to an abnormality, if occurs, more safely, more reliably, and promptly. This invention includes: obtaining, via a management device, sensing data from a sensor detecting biological information of the user or rearing animal using the lockable space section; detecting, via the management device, a significant difference between the sensing data and sensing data obtained in a normal condition or a threshold thereof; requesting, upon detection of the significant difference as necessary, dispatch of an emergency agency to the lockable (Continued)

space section; confirming, via the management device, whether the emergency agency having received the request has arrived at the lockable space section; and causing the management device to issue a signal for carrying out emergency unlocking of a lock in the lockable space section.

16 Claims, 6 Drawing Sheets

(56) References Cited

U.S. PATENT DOCUMENTS

| | | | | |
|---|---|---|---|---|
| 5,462,051 | A * | 10/1995 | Oka | A61B 5/0022 128/903 |
| 5,544,649 | A * | 8/1996 | David | G16H 80/00 600/587 |
| 5,785,650 | A * | 7/1998 | Akasaka | A61N 1/37282 600/300 |
| 6,073,004 | A * | 6/2000 | Balachandran | H04W 76/50 455/457 |
| 6,603,401 | B1 | 8/2003 | Ueyama | |
| 7,420,472 | B2 * | 9/2008 | Tran | A61B 5/1117 340/539.11 |
| 7,567,200 | B1 * | 7/2009 | Osterweil | G01S 13/56 342/28 |
| 8,866,606 | B1 * | 10/2014 | Will | G08B 25/005 455/418 |
| 9,036,902 | B2 * | 5/2015 | Nathan | G08B 17/12 382/159 |
| 9,412,255 | B1 * | 8/2016 | Frost | G08B 21/0469 |
| 9,769,420 | B1 * | 9/2017 | Moses | H04N 7/147 |
| 9,898,912 | B1 * | 2/2018 | Jordan, II | H04L 12/2825 |
| 10,825,318 | B1 * | 11/2020 | Williams | G08B 21/0469 |
| 10,868,693 | B2 * | 12/2020 | Lee | A61M 21/02 |
| 10,896,599 | B1 * | 1/2021 | Roberts | G06F 3/011 |
| 11,145,016 | B1 * | 10/2021 | Brophy | G08B 25/001 |
| 11,284,238 | B1 * | 3/2022 | Wen | H04L 67/12 |
| 11,587,555 | B1 * | 2/2023 | Pathak | G10L 15/16 |
| 2003/0069002 | A1 * | 4/2003 | Hunter | G08B 21/12 455/567 |
| 2003/0117279 | A1 * | 6/2003 | Ueno | G08B 21/0423 340/523 |
| 2006/0010007 | A1 * | 1/2006 | Denman | G06Q 40/08 705/2 |
| 2006/0055528 | A1 * | 3/2006 | Akamatsu | G08B 25/002 340/521 |
| 2006/0089538 | A1 * | 4/2006 | Cuddihy | A61B 5/0002 600/595 |
| 2006/0145811 | A1 * | 7/2006 | Nantz | B60R 25/209 340/5.72 |
| 2007/0008154 | A1 * | 1/2007 | Albert | G08B 21/0453 340/573.1 |
| 2007/0096927 | A1 * | 5/2007 | Albert | G08B 21/22 600/300 |
| 2007/0269020 | A1 * | 11/2007 | Chavez | G07C 9/00182 379/12 |
| 2009/0015413 | A1 * | 1/2009 | Gelabert | G06K 19/0716 340/572.1 |
| 2009/0036159 | A1 * | 2/2009 | Chen | H04Q 11/0478 455/556.1 |
| 2010/0160744 | A1 * | 6/2010 | Ha | G08B 21/0446 600/301 |
| 2010/0217345 | A1 * | 8/2010 | Wolfe | A61B 7/04 600/528 |
| 2010/0283618 | A1 * | 11/2010 | Wolfe | A61B 7/003 381/71.1 |
| 2010/0286567 | A1 * | 11/2010 | Wolfe | A61B 5/4818 600/587 |
| 2011/0041418 | A1 * | 2/2011 | Meserini | E04H 1/02 52/79.9 |
| 2011/0090085 | A1 * | 4/2011 | Belz | H04N 21/44218 348/143 |
| 2012/0042326 | A1 * | 2/2012 | Jain | A61B 5/0022 719/318 |
| 2012/0229647 | A1 * | 9/2012 | Calman | G08B 21/0476 348/158 |
| 2012/0262294 | A1 * | 10/2012 | Nikolovski | G08B 21/043 340/565 |
| 2012/0265040 | A1 * | 10/2012 | Ito | G16H 50/20 600/323 |
| 2013/0109997 | A1 * | 5/2013 | Linke | A61B 5/0008 600/300 |
| 2013/0141233 | A1 * | 6/2013 | Jacobs | G16H 20/40 340/521 |
| 2013/0245389 | A1 * | 9/2013 | Schultz | A61B 5/0002 600/301 |
| 2014/0070958 | A1 * | 3/2014 | Foo | A61B 5/742 340/870.07 |
| 2014/0142729 | A1 * | 5/2014 | Lobb | G06F 3/0304 700/90 |
| 2014/0225746 | A1 * | 8/2014 | Nagase | A61B 5/746 340/870.09 |
| 2015/0066538 | A1 * | 3/2015 | Dantsker | G16H 40/63 705/2 |
| 2015/0094914 | A1 * | 4/2015 | Abreu | B60H 1/00742 701/1 |
| 2015/0105687 | A1 * | 4/2015 | Abreu | A61F 7/00 600/549 |
| 2015/0170447 | A1 * | 6/2015 | Buzhardt | G07C 9/00182 340/5.2 |
| 2015/0310173 | A1 * | 10/2015 | Coney | H04L 63/0428 705/3 |
| 2015/0356849 | A1 * | 12/2015 | Ishii | G08B 21/0423 340/573.1 |
| 2016/0125168 | A1 * | 5/2016 | Aagesen | G16H 10/60 705/3 |
| 2016/0196731 | A1 * | 7/2016 | Aich | G08B 25/08 340/539.17 |
| 2016/0224839 | A1 * | 8/2016 | Dempsey | G08B 21/0476 |
| 2016/0358455 | A1 * | 12/2016 | Ball | G08B 25/10 |
| 2017/0103644 | A1 * | 4/2017 | Chauhan | G06F 3/04847 |
| 2017/0173262 | A1 * | 6/2017 | Veltz | G16H 20/17 |
| 2017/0278363 | A1 * | 9/2017 | Webb | G07C 9/00 |
| 2018/0103874 | A1 * | 4/2018 | Lee | A61B 5/1113 |
| 2018/0153482 | A1 * | 6/2018 | Watanabe | A61B 5/02055 |
| 2018/0199825 | A1 * | 7/2018 | Murai | A61B 5/0015 |
| 2018/0310159 | A1 * | 10/2018 | Katz | H04W 4/50 |
| 2018/0336970 | A1 * | 11/2018 | Sherwood | A61B 5/082 |
| 2018/0342081 | A1 * | 11/2018 | Kim | G06V 20/52 |
| 2018/0356241 | A1 * | 12/2018 | Correnti | G01C 21/206 |
| 2019/0087510 | A1 * | 3/2019 | Rexach | A61B 5/6889 |
| 2019/0087906 | A1 * | 3/2019 | Fields | G16H 15/00 |
| 2019/0090786 | A1 * | 3/2019 | Kim | G06N 3/08 |
| 2019/0130725 | A1 * | 5/2019 | Dempsey | G08B 19/00 |
| 2019/0150851 | A1 * | 5/2019 | Clark | A61B 5/024 |
| 2019/0167176 | A1 * | 6/2019 | Annoni | A61B 5/4035 |
| 2019/0167209 | A1 * | 6/2019 | Annoni | A61B 5/0826 |
| 2019/0171780 | A1 * | 6/2019 | Santarone | G02B 27/0093 |
| 2019/0197802 | A1 | 6/2019 | Novero et al. | |
| 2019/0325725 | A1 * | 10/2019 | Cire | G16H 40/67 |
| 2019/0371148 | A1 * | 12/2019 | Bailey | G08B 5/36 |
| 2019/0391227 | A1 * | 12/2019 | Zhang | H04Q 9/00 |
| 2020/0085370 | A1 * | 3/2020 | Hill | A61B 5/01 |
| 2020/0116824 | A1 * | 4/2020 | Yang | G01S 13/87 |
| 2020/0135005 | A1 * | 4/2020 | Katz | G06F 9/542 |
| 2020/0196942 | A1 * | 6/2020 | Ozturk | A61B 5/7264 |
| 2020/0252508 | A1 * | 8/2020 | Gray | H04M 1/6041 |
| 2020/0378758 | A1 * | 12/2020 | Yang | A61B 5/024 |
| 2020/0383608 | A1 * | 12/2020 | Ramesh | A61B 5/1126 |
| 2021/0248893 | A1 * | 8/2021 | Van Dinther | G08B 25/016 |
| 2021/0256829 | A1 * | 8/2021 | Ten Kate | G08B 21/0469 |
| 2021/0385753 | A1 * | 12/2021 | Kontio | H04W 52/0277 |

(56) References Cited

U.S. PATENT DOCUMENTS

| | | | | |
|---|---|---|---|---|
| 2023/0070772 A1* | 3/2023 | Bingham | ............. | G08B 19/005 |
| 2023/0107712 A1* | 4/2023 | Gil | ......................... | G16H 20/70 |
| | | | | 700/28 |

FOREIGN PATENT DOCUMENTS

| | | |
|---|---|---|
| JP | 2003-228781 | 8/2003 |
| JP | 2004-234136 | 8/2004 |
| JP | 2005-197812 | 7/2005 |
| JP | 2012-078971 | 4/2012 |
| JP | 2014-230207 | 12/2014 |
| JP | 2015-26146 | 2/2015 |
| JP | 2016-85645 | 5/2016 |
| JP | 2017-153850 | 9/2017 |
| JP | 2019-67266 | 4/2019 |
| WO | WO 01/04441 | 1/2001 |

OTHER PUBLICATIONS

International Preliminary Report on Patentability for PCT/JP2020/025256 and its English translation, dated Sep. 24, 2020.

Office Action For GB Patent Application No. 2200175.4, dated Nov. 22, 2023, 4 pages.

Office Action For JP Application No. 2021-529996, dated Dec. 18, 2023, 3 pages.

Office Action For JP Patent Application No. 2021-529996, dated Jul. 2, 2024, 7 pages.

* cited by examiner

EMERGENCY RESPONDING METHOD, SAFETY CONFIRMATION SYSTEM, MANAGEMENT DEVICE, SPACE SECTION, AND METHOD FOR CONTROLLING MANAGEMENT DEVICE

TECHNICAL FIELD

The present invention relates to a safety confirmation system (safety checking system) and/or the like capable of (i) determining an abnormality of a user or a rearing animal using a space section that is lockable (such a space section may also be referred to as a "lockable space section") and (ii) requesting emergency help.

BACKGROUND ART

There are many cases of sudden illness and accidents in lockable space sections. In addition, in recent years, the society is aging and the number of people living alone is increasing. Thus, particularly, the importance in responding to accidents and sudden illness in residences has increased more and more.

In order to deal with this, for example, Patent Literature 1 discloses a building including a sensor provided in a living space where a resident is living, wherein, upon detection of a preset abnormal state, the sensor issues a notice for promoting checking for safety of the resident.

Patent Literature 2 discloses a living body monitoring system including a sensor for detecting a motion of a living body and a sensor for detecting a state of a living environment in which the living body is living, wherein the living body monitoring system analyzes the activity of the living body on the basis of the detection results from the sensors so as to as to make a determination as to an abnormality state.

Patent Literature 3 discloses an electronic lock control system for controlling locking or unlocking of an electronic lock, wherein the electronic lock control system transmits an unlocking instruction to the electronic lock along with communication with respect to a preset contact destination.

CITATION LIST

Patent Literature

[Patent Literature 1]
Japanese Patent Application Publication Tokukai No. 2015-26146 (Publication date: Feb. 5, 2015)
[Patent Literature 2]
Japanese Patent Application Publication Tokukai No. 2017-153850 (Publication date: Sep. 7, 2017)
[Patent Literature 3]
International Publication No. 01/004441 (Publication date: Jan. 18, 2001)

SUMMARY OF INVENTION

Technical Problem

Unfortunately, however, it cannot be said the above conventional techniques are sufficient. In order to accurately determine an abnormality of a user or a rearing animal using a lockable space section and to respond to an abnormality, if occurs, more safely, more reliably, and promptly, there has been room for further improvement in responding.

An aspect of the present invention was made in view of the above problem, and has an object to provide a safety checking system and/or the like capable of accurately determining an abnormality of a user or a rearing animal using a lockable space section and responding to an abnormality, if occurs, more safely, more reliably, and promptly.

Solution to Problem

In order to attain the above object, a method in accordance with an aspect of the present invention for emergently responding to an abnormality in a living body of a user or a rearing animal using a space section that is lockable, the method including: an obtaining step of obtaining, via a management device, sensing data from a sensor that detects biological information of the user or the rearing animal using the space section that is lockable; a detecting step of detecting, via the management device, a significant difference between (i) the sensing data thus obtained and (ii) sensing data obtained in a normal condition or a threshold of the sensing data; an emergency help requesting step of requesting, upon detection of the significant difference as necessary, dispatch of an emergency agency to the space section that is lockable; an arrival confirming step of confirming, via the management device, whether the emergency agency having received the request has arrived at the space section that is lockable; and an unlocking step of causing the management device to issue a signal for carrying out emergency unlocking of a lock provided in the space section that is lockable.

In order to attain the above object, a method in accordance with an aspect of the present invention for emergently responding to an abnormality in a living body of a user or a rearing animal using a space section that is lockable, the method including: an obtaining step of obtaining, via a management device, sensing data from a sensor that detects biological information of the user or the rearing animal using the space section that is lockable; a detecting step of detecting, via the management device, a significant difference between (i) the sensing data thus obtained and (ii) sensing data obtained in a normal condition or a threshold of the sensing data; an alarming step of giving a notification of an abnormality to a watcher upon detection of the significant difference; an arrival confirming step of confirming, via the management device, whether the watcher having received the notification has arrived at the space section that is lockable; and an unlocking step of causing the management device to issue a signal for carrying out emergency unlocking of a lock provided in the space section that is lockable.

In order to attain the above object, a safety checking system in accordance with an aspect of the present invention includes: a first sensor provided in a space section that is lockable and that allows a user or a rearing animal to go in and out, the first sensor being configured to detect biological information of the user or the rearing animal using the space section; a storage section configured to store at least a threshold of the biological information or sensing data obtained by the first sensor; a detecting section configured to compare sensing data obtained by the first sensor with the threshold or the sensing data stored in the storage section to detect an abnormality; a communication section configured to provide communication between the space section and the acceptance management section; an alarming section configured to cause a reporting section to issue an alarm in a case where the detecting section detects the abnormality, the reporting section being configured to report occurrence of an abnormality to the acceptance management section via the communication section; an arrival information presenting part configured to present, to the acceptance management section, arrival of an emergency agency at the lockable space section, the emergency agency being dispatched in response to a dispatch request from the acceptance management section; and an unlocking part configured to carry out, in response to an unlocking request from the acceptance management section, emergency unlocking of a lock provided to the lockable space section.

In order to attain the above object, a safety checking system in accordance with an aspect of the present invention includes: a first sensor provided in a space section that is lockable and that allows a user or a rearing animal to go in and out, the first sensor being configured to detect biological information of the user or the rearing animal using the space section; a storage section configured to store at least a threshold of the biological information or sensing data obtained by the first sensor; a detecting section configured to compare sensing data obtained by the first sensor with the threshold or the sensing data stored in the storage section to detect an abnormality; a communication section configured to provide communication between at least the space section and an information terminal of a watcher of the user or the rearing animal; an alarming section configured to cause a reporting section to issue an alarm in a case where the detecting section detects the abnormality, the reporting section being configured to report occurrence of an abnormality to the information terminal via the communication section; an arrival information presenting part configured to present, to the acceptance management section, arrival of the watcher at the space section; and an unlocking part configured to carry out, in response to an unlocking request from the acceptance management section, emergency unlocking of a lock provided to the lockable space section.

In order to attain the above object, a management device in accordance with an aspect of the present invention is a management device that is communicable with a space section via a telecommunications line, the space section being remotely lockable, the management device including: an obtaining section provided in the space section that is lockable, the obtaining section being configured to obtain sensing data from a first sensor that detects biological information of a user or a rearing animal using the space section that is lockable; a detecting section configured to detect an abnormality on a basis of (i) the sensing data obtained by the first sensor and (ii) biological information of the user or the rearing animal using the space section that is lockable which biological information is obtained in a normal condition or a threshold of the biological information; an alarming section configured to cause a reporting section to issue an alarm in a case where the detecting section detects the abnormality, the reporting section being configured to report occurrence of an abnormality; an arrival information presenting section configured to present information indicative of arrival of an emergency agency at the space section that is lockable, the emergency agency being dispatched in response to a dispatch request from an acceptance management section of the management device; and an unlocking section configured to carry out, in response to an unlocking request from the acceptance management section, emergency unlocking of a lock provided to the space section that is lockable.

In order to attain the above object, a management device in accordance with an aspect of the present invention is a management device that is communicable with a space section via a telecommunications line, the space section being remotely lockable, the management device including: an obtaining section provided in the space section that is lockable, the obtaining section being configured to obtain sensing data from a first sensor that detects biological information of a user or a rearing animal using the space section that is lockable; a detecting section configured to detect an abnormality on a basis of (i) the sensing data obtained by the first sensor and (ii) biological information of the user or the rearing animal using the space section that is lockable which biological information is obtained in a normal condition or a threshold of the biological information; an alarming section configured to cause a reporting section to issue an alarm in a case where the detecting section detects the abnormality, the reporting section being configured to report occurrence of an abnormality; an arrival information presenting section configured to present, in response to the alarm, information indicative of arrival of a watcher at the space section that is lockable; and an unlocking section configured to carry out, in response to an unlocking request from an acceptance management section, emergency unlocking of a lock provided to the space section that is lockable.

In order to attain the above object, a space section that is lockable in accordance with an aspect of the present invention includes: a first sensor configured to detect biological information of a user or a rearing animal using the space section that is lockable; a second sensor configured to detect falling-down of the user or the rearing animal in the space section that is lockable and to detect, after the falling-down, presence or absence of a motion of the user or the rearing animal having fallen down; a detecting section configured to determine whether or not the user or the rearing animal having fallen down moves after the falling-down on a basis of sensing data obtained by the second sensor and to detect presence or absence of an abnormality on a basis of (i) sensing data obtained by the first sensor and (ii) biological information of the user or the rearing animal having fallen down which biological information is obtained in a normal condition or a threshold of the biological information; and a notifying section configured to externally notify occurrence of the abnormality in a case where the detecting section detects the abnormality.

In order to attain the above object, a method in accordance with an aspect of the present invention for controlling a management device is a method for controlling a management device that is communicable with a space section via a telecommunications line, the space section being remotely lockable, the method including: an obtaining step of obtaining sensing data from a first sensor provided in the space section that is lockable, the first sensor being configured to detect biological information of a user or a rearing animal using the space section that is lockable; a detecting step of detecting presence or absence of an abnormality on a basis of (i) the sensing data obtained by the first sensor and (ii) biological information of the user or the rearing animal using the space section that is lockable which biological information is obtained in a normal condition or a threshold of the biological information; an alarming step of causing a reporting section to issue an alarm in a case where the abnormality is detected in the detecting step, the reporting section being configured to report occurrence of an abnormality; an arrival information presenting step of presenting information indicative of arrival of an emergency agency at the space section that is lockable, the emergency agency being dispatched in response to a dispatch request from an acceptance management section of the management device; and an unlocking step of carrying out, in response to an unlocking request from the acceptance management section, emergency unlocking of a lock provided at an entrance of the space section that is lockable.

In order to attain the above object, a method in accordance with an aspect of the present invention for controlling a management device is a method for controlling a management device that is communicable with a space section via a telecommunications line, the space section being remotely lockable, said method including: an obtaining step of obtaining sensing data from a first sensor provided in the space section that is lockable, the first sensor being configured to detect biological information of a user or a rearing animal using the space section that is lockable; a detecting step of detecting presence or absence of an abnormality on a basis of (i) the sensing data obtained by the first sensor and (ii) biological information of the user or the rearing animal using the space section that is lockable which biological information is obtained in a normal condition or a threshold of the biological information; an alarming step of causing a reporting section to issue an alarm in a case where the abnormality is detected in the detecting step, the reporting section being configured to report occurrence of an abnormality; an arrival information presenting step of presenting, in response to the alarm, information indicative of arrival of a watcher at the space section that is lockable; and an unlocking step of carrying out, in response to an unlocking request from an acceptance management section, emergency unlocking of a lock provided at an entrance of the space section that is lockable.

With the above configuration, the state of the user or the rearing animal is sensed by the sensor provided in the lockable space section. Then, on the basis of sensing data thus obtained, a determination as to the presence or absence of an abnormality in the user or the rearing animal is made. If the presence of an abnormality is determined, the acceptance management section checks for safety of the user or the rearing animal. If safety of the user or the rearing animal cannot be confirmed, emergency help is requested. When an emergency agency arrives at the residence of the user or the rearing animal, confirmation is made by the acceptance management section, and then the lock of the lockable space section is unlocked. This makes it possible to quickly find an abnormality in the user or the rearing animal in the lockable space section. In addition, since the safety confirmation is carried out by the acceptance management section, it is possible to prevent an unnecessary request for emergency help. In addition, since the acceptance management section confirms whether or not a visitor having arrived at the lockable space section used by the user or the rearing animal is an emergency agency, it is possible to prevent unlocking of the lock of the lockable space section in a case where the visitor is not the emergency agency. As described above, the above configuration enables an accurate determination of an abnormality in the user or the rearing animal, thereby making it possible to respond to an abnormality, if occurs, more safely, more reliably, and promptly.

A safety checking system in accordance with each aspect of the present invention may be realized by a computer. In this case, the present invention encompasses (i) a safety checking system control program for causing a computer to operate as each part (software element) of the safety checking system to realize the safety checking system by the computer and (ii) a computer-readable storage medium storing the safety checking system control program.

Advantageous Effects of Invention

In accordance with an aspect of the present invention, it is possible to accurately determine an abnormality in a user or a rearing animal using a lockable space section and to respond to an abnormality, if occurs, more safely, more reliably, and promptly.

DESCRIPTION OF EMBODIMENTS

Embodiment 1

The following description will discuss the details of an embodiment of the present invention with reference to the drawings. The embodiments described below include various limitations technically preferred to implement aspects of the present invention. However, the scope of the present invention is not limited to the embodiments and the illustrated examples.

[Overview]

Figure 1:
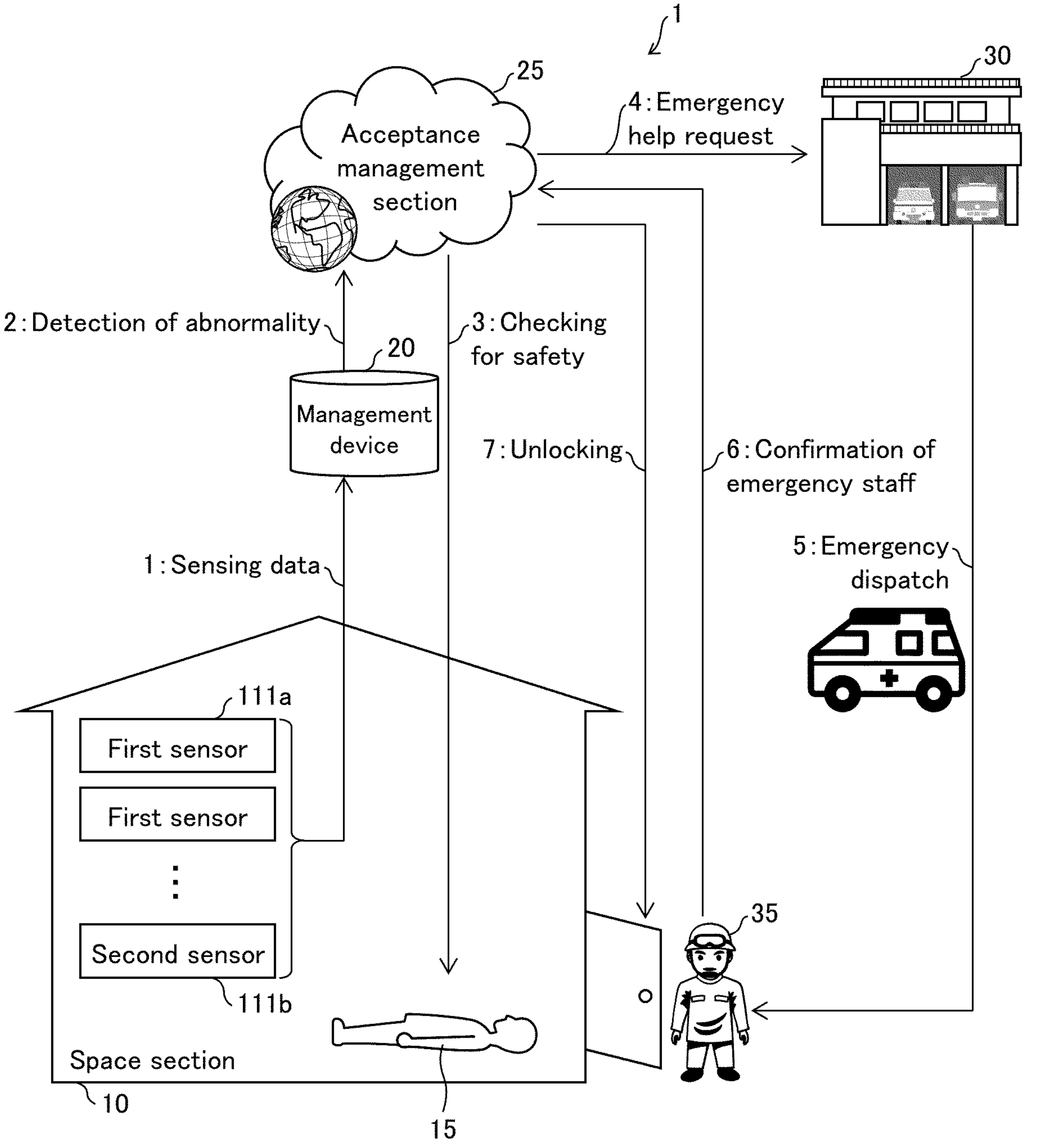
FIG. 1 is a view illustrating an overview of a safety checking system in accordance with an embodiment of the present invention.

First, with reference to FIG. 1, the following description will discuss an overview of a safety checking system 1 in accordance with Embodiment 1. FIG. 1 is a view illustrating the overview of the safety checking system 1. As shown in FIG. 1, the safety checking system 1 includes a lockable space section 10 that is used by a user 15 or a rearing animal, a management device 20 of a management company, and an acceptance management section 25.

[Specific Examples of Lockable Space Section]

Examples of the lockable space section 10 encompass, but are not limited to, fixed buildings such as residences, dormitory facilities, multiple dwelling houses, and various facilities. In addition, examples of the lockable space section 10 encompass unfixed vehicles such as passenger ships and trains with sleeping cars. Furthermore, examples of the lockable space section 10 encompass, but are not limited to, buildings that shut off outside air. In addition, examples of the lockable space section 10 encompass zoos, stables, piggeries, henneries, and cages for domestic pets and laboratory animals, each used by rearing animals.

Examples of the residence encompass, but are not limited to, an independent house for a single family. In addition, examples of the residence encompass a non-unit ownership housing including multiple portions for multiple families which portions are individually managed with a lock, such as a two-family house and a residence with services for the elderly. Examples of the dormitory facility encompass, but are not limited to, a building that can be locked as a single building, the building including rooms that are not individually managed with a lock. Examples of the dormitory facility also encompass a building including rooms that are managed with a lock, the rooms being not a common element. Examples of the multiple dwelling house encompass, but are not limited to, rooms that are exclusive elements of a unit ownership building (e.g., an apartment house or a condominium). In addition, examples of the multiple dwelling house encompass a lockable annex building. Examples of the condominium encompass a condominium including rooms that are individually managed with a lock and a condominium that is managed with a lock as a single building.

Examples of the various facilities encompass lodging facilities such as hotels, guesthouses, and tourist homes, welfare and nursing facilities such as homes for the elderly and daycare facilities, medical facilities such as hospitals and clinics, educational and childcare facilities such as schools, kindergartens, nurseries, centers for early childhood education and care, and facilities for after-school activities, commercial institutions for business offices, theaters, complex cafes, and karaoke joints, exhibition facilities such as art galleries and museums, public facilities such as citizen's halls and child centers, stadiums such as gymnasiums and facilities for martial arts, and other facilities such as public laboratories, warehouses, factories, and garages.

Examples of the vehicle encompass automobiles such as owner-driver cars, buses, and taxis, trains such as regular cars and sleeping cars, aircrafts such as airplanes and helicopters, ships such as general ships, accommodation ships, submarines, and spacecrafts such as space stations and rockets.

For example, in a case where the lockable space section 10 is a residence or a multiple dwelling house, the user 15 is a resident, a member of his/her family, or a temporary sojourner, whereas the rearing animal is a domestic pet. As will be described later, in a case where a camera is provided in the lockable space section 10 as one example of an image-capturing sensor, it is possible to carry out image analysis to distinguish the user 15 from the rearing animal. In a case where the lockable space section 10 is a facility, the user 15 may be, but is not limited to, an employee, and alternatively the user 15 may be a visitor. In a case where the lockable space section 10 is a zoo, the rearing animal is an animal raised in the zoo. In a case where the lockable space section 10 is a stable, the rearing animal is a horse raised therein. In a case where the lockable space section 10 is a hennery, the rearing animal is a chicken. The rearing animal may be a laboratory animal used for researches and experiments. In this case, the lockable space section 10 is a research facility, an experiment facility, or a cage for the laboratory animal. A subject to be detected is not limited to a single user 15 or a single rearing animal, and may alternatively be two or more users 15 or two or more rearing animals. In a case where two or more users 15 or two or more rearing animals are subjects to be detected, it is preferable to detect the two or more individuals at once while identifying the individuals and to manage information thereof in association with their respective individual identifiers.

[Sensing in Lockable Space Section]

The lockable space section 10 includes one or more sensors 111 provided therein. Sensing data obtained by the sensor(s) 111 can be transmitted to the management device 20 of the management company via wired communication or radio communication. That is, the lockable space section 10 and the management device 20 are communicable with each other via a telecommunications line (e.g., the Internet, a dedicated circuit, or a telephone circuit). The sensor(s) 111 includes a first sensor **111*a* that obtains biological information (heart rate, respiratory rate) of the user 15 or the rearing animal and a second sensor 111*b* that obtains body motion information (behavior) of the user 15 or the rearing animal. The description below uses the term "sensor 111**" for these sensors in a case where there is no need to discriminate these sensors from each other. The biological information is not limited to the heart rate or the respiratory rate, but may be blood pressure, body temperature, image information of a skeleton, and/or the like.

The sensing information is not limited to the above-described biological information, but may be sound information indicative of an abnormal sound and/or a crime sound such as a scream and/or a groan, information indicative of an amount of consumption of a household energy such as electricity, water, and/or gas, behavior data indicative of an operation(s) of a household appliance(s) and/or a history of opening/closing of a door(s), and usage information indicative of a communication volume of an information terminal or the like. These pieces of information are preferably sensed by other sensor(s). For example, in a case where a sound sensor has sensed an abnormal sound and/or a crime sound including a scream and/or a groan, the sensing of the sound information can trigger sensing of the biological information. As will be described later, in a case where the lockable space section 10 includes a camera as one example of an image-capturing sensor, the sensing of the sound information can trigger image-capturing with the camera, and information of an image thus captured and stored can be checked later. The information that functions as a trigger is not limited to the sensing of the sound information. Alternatively, the trigger may be a change in the amount of consumption of a household energy, a change in the behavior data, a change in the usage information indicative of the communication volume or the like.

In view of the above-described configuration including various sensors arranged therein, the various sensors are preferably adjusted so as to avoid interference between the radio wave frequencies thereof in a case where the various sensors operate constantly.

The management device 20 is preferably placed at a location remote from the lockable space section 10, e.g., at the management company (e.g., a service provider, a housing company). Alternatively, the management device 20 may be disposed in the lockable space section 10.

The safety checking system 1 in accordance with Embodiment 1 is configured such that the state of the user 15 or the rearing animal using the lockable space section 10 is sensed by the various sensors 111 provided in the lockable space section and sensing data thus obtained is transmitted to the management device 20. The management device 20 analyzes the received sensing data to determine the presence or absence of an abnormality in the user 15 or the rearing animal. More specifically, the management device 20 determines whether or not the user 15 or the rearing animal has fallen down. If the user 15 or the rearing animal has fallen down, the management device 20 determines whether or not the user 15 or the rearing animal stays in the fallen state. Then, if the management device 20 determines that the heart rate, the respiratory rate, and/or the like is/are different from those observed in a normal condition (i.e., a significant difference is found), the management device 20 determines the presence of an abnormality. If the management device 20 determines the presence of an abnormality, the management device 20 notifies the abnormality to the acceptance management section 25. The acceptance management section 25 checks for safety of the user 15 or the rearing animal in the lockable space section 10. If the acceptance management section 25 cannot confirm safety of the user 15 or the rearing animal, the acceptance management section 25 requests an emergency agency for emergency help. In a case where safety of the user 15 cannot be confirmed, it is preferable to request a fire station 30 for emergency help. In a case where safety of the rearing animal cannot be confirmed, it is preferable to request a veterinary hospital or the like for emergency help. Then, when an emergency staff 35 arrives at the lockable space section 10, the acceptance management section 25 confirms, with a camera 130 provided in the lockable space section 10, that the person who has arrived at the lockable space section 10 is the emergency staff 35, and remotely unlocks a door of the lockable space section 10. In the description in Embodiment 1, a door at an entrance of the space section 10 is taken as a specific example of a subject to be unlocked. However, the subject to be unlocked is not limited to the door, and may alternatively be a window, a gate, a front door, or any of other openings.

[Reception Management Section 25]

The acceptance management section 25 may be an operation(s) carried out by an operator. The operation(s) carried out by the operator may be partially or entirely replaced with machine leaning such as artificial intelligence (AI) and/or the like. The data related to the acceptance that the operator handles has a large information quantity. Thus, machine learning such as AI and/or the like is one useful option for generating determination information.

In this case, as the acceptance management section 25, a device in which a program related to AI and/or the like is implemented may be provided independently. Alternatively, such a program may be incorporated and implemented in the management device 20. In the latter case, the management device 20 in which the program related to AI and/or the like is implemented functions as the acceptance management section 25.

Specific methods with which the acceptance management section 25 carries out the data analysis and the process for generating the determination information by no means limit Embodiment 1. For example, the methods can be any of the following machine learning techniques or a combination of any of them.

Support vector machine (SVM)
Clustering
Inductive logic programming (ILP)
Genetic programming (GP)
Bayesian network (BN)
Neural network (NN)

In a case where a neural network is used, sensing data to be input should be processed in advance for input into the neural network. It is possible to apply, to such processing, a method such as data augmentation in addition to arranging data in a one-dimensional array or a multidimensional array.

Further, in a case where the neural network is used, it is possible to use a convolutional neural network (CNN) including convolution processing or a recurrent neural network (RNN) containing recursive processing. In a case where the CNN is used, more specifically, the neural network can be configured to include, as one or more layers, a convolution layer(s) in (each of) which a convolution operation is performed, and to carry out a filtering operation (product-sum operation) with respect to input data which is input to the convolution layer(s). Further, in a case where the filtering operation is carried out, it is possible to also use processing such as padding, or to use a stride width which is appropriately set.

Furthermore, it is possible to use, as the neural network, a multilayer or super multilayer neural network having several tens to several thousands of layers.

The machine learning used to process the sensing data may be supervised learning or unsupervised learning.

The program and/or data used for the data processing is preferably stored in the acceptance management section. Alternatively, the program and/or data used for the data processing may be stored in an external storage part.

As described above, with the safety checking system 1 in accordance with Embodiment 1, for example, in a case where the user 15 using the lockable space section falls down in the lockable space section 10 so as to come into a condition different from a normal condition, the acceptance management section 25 checks for safety. If the acceptance management section 25 cannot confirm the safety of the user, the acceptance management section 25 requests emergency help. Then, the acceptance management section 25 confirms that a person who has arrived at the lockable space section 10 is an emergency staff 35, and unlocks the lock provided to the lockable space section 10. This makes it possible to safely, reliably, and promptly respond to the abnormality occurred in the user 15 using the lockable space section.

In Embodiment 1, it is determined whether or not the user 15 using the lockable space section is in a fallen state. Then, if the user 15 is in the fallen state, a determination is made as to whether or not there is an abnormality in the heart rate, the respiratory rate, and/or the like. Alternatively, without making the determination as to the fallen state, a determination may be made as to whether or not there is an abnormality in the user 15, on the basis of a significant difference between the heart rate, the respiratory rate, and/or the like obtained at this time and those obtained in a normal condition.

[Details of Lockable Space Section 10 and Management Device 20]

Figure 3:
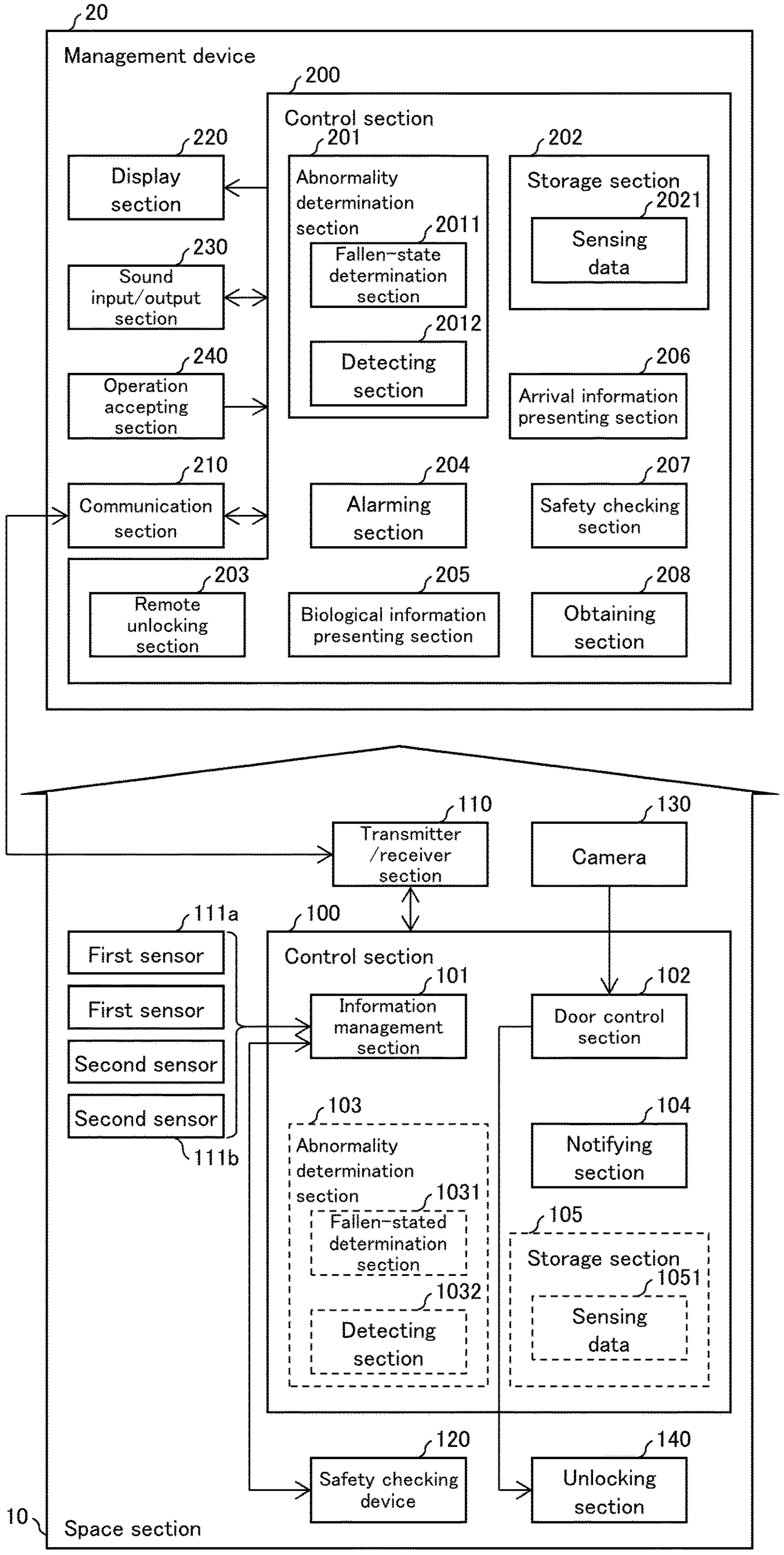
FIG. 3 is a functional block diagram of a space section and a management device included in the safety checking system.

Next, with reference to FIG. 3, the following description will discuss details of the lockable space section 10 and the management device 20. FIG. 3 is a functional block diagram of the lockable space section 10 and the management device 20.

As shown in FIG. 3, the lockable space section 10 includes a control section 100, a transmitter/receiver section 110, a safety checking device 120, a camera (image capturing section) 130, an unlocking section 140, and the sensor(s) 111.

The sensor(s) 111 is/are one or more sensors provided in the lockable space section 10. In a case where the lockable space section 10 is a building, it is preferable that one or more sensors be provided in each room. The sensor(s) 111 includes a first sensor 111*a* that can detect biological information and/or the like of the user 15 or the rearing animal in a non-contact manner and a second sensor 111*b* that can detect a behavior of the user 15 or the rearing animal in a non-contact manner. The sensor(s) 111 is/are not limited to the first sensor 111*a* and the second sensor 111*b*, and may include a wearable sensor (not illustrated) that can detect vital data.

As the first sensor 111*a*, one or more radiowave sensors may be provided in the lockable space section 10. With this, it is possible to sense the respiratory rate, the heart rate, and/or the like of the user 15 or the rearing animal. Sensing the biological information of a living body with a radiowave sensor can be carried out by use of a known technique. Therefore, detailed description thereof is omitted here. The biological information can be obtained by emitting a radio wave to a subject to be detected, detecting a reflected wave, and analyzing a signal thus detected. (For example, see Japanese Patent Application Publications Tokukai No. 2017-153850, Tokukai No. 2009-060989, and Tokukai No. 2000-83927.)

The second sensor 111*b* includes a body motion information sensor such as a human sensor that detects a behavior of the user 15 or the rearing animal and an environmental sensor that can detect a state of the lockable space section 10. Examples of the human sensor encompass a pressure sensor, an infrared sensor, an image sensor, and an open/close sensor. Examples of the environmental sensor encompass a sound sensor, a temperature sensor, and an illuminance sensor.

The pressure sensor may be provided on a floor face of the lockable space section 10, for example. This makes it possible to detect a pressure applied by, e.g., the weight of the user 15 or the rearing animal. With this, it is possible to detect the situation in which the user 15 or the rearing animal is laid at an inappropriate place, i.e., the situation in which the user 15 or the rearing animal is in a fallen state. Also, it is possible to detect movement of the user 15 or the rearing animal in the lockable space section 10.

If the place where the user 15 or the rearing animal having fallen down can be identified, it is preferable to adjust the angles of the various sensors with respect to the fallen-down place. Adjusting the angles of the various sensors can improve the sensing accuracy.

Meanwhile, by providing the human sensor at, e.g., a door of the lockable space section 10, it is possible to detect the user 15 or the rearing animal going into or out the lockable space section 10.

Each sensor 111 transmits, to an information management section 101 of the control section 100, sensing data indicative of the sensing result. In a case where the user 15 or the rearing animal wears a wearable sensor that can detect vital data, the information indicative of the vital data detected by the wearable sensor can also be transmitted to the information management section 101 of the control section 100.

The control section 100 controls various devices provided in the lockable space section 10, and includes the information management section 101, a door control section 102, and a notifying section 104. In another preferred embodiment, the control section 100 further includes an abnormality determination section 103 (fallen-state determination section 1031, detecting section 1032) and a storage section 105 that stores sensing data 1051. The control section 100 stores, in its inside, various control programs to be executed by CPU, data thereof, and/or the like, and executes various processes in accordance with the programs.

The information management section 101 obtains the sensing data from the sensor(s) 111, and transmits the sensing data to the management device 20 via the transmitter/receiver section 110. The description in Embodiment 1 will specifically discuss an example in which the sensing data is transmitted to the management device 20. In another preferred embodiment, however, this is not limitative. For example, any of the sensor(s) 111 may include an edge computer provided with a control determination section including a storage section and an abnormality determination section.

A door control section 102 obtains an image obtained by the camera 130 provided at, e.g., the entrance of the lockable space section 10, and transmits the image to the management device 20 via the transmitter/receiver section 110. In accordance with an instruction from the management device 20, the door control section 102 controls the unlocking section 140 to unlock the door of the lockable space section 10. The door control section 102 can transmit, to the management device 20 via the transmitter/receiver section 110, information related to locking/unlocking of the lock of the lockable space section 10. For example, the door control section 102 can transmit, to the management device 20 via the transmitter/receiver section 110, control information of the lock that is to be controlled by the door control section 102, so as to cause a display section 220 of the management device 20 to display the locked state or the unlocked state of the lock. In a case where the acceptance management section 25 is an operator, the operator can confirm, from the lock state information displayed on the display section 220, whether or not re-locking by automatic locking has been carried out after unlocking. In a case where the acceptance management section 25 is incorporated and implemented in the management device 20, the acceptance management section 25 can determine, on the basis of the lock control information received via a communication section 210, whether the lock of the lockable space section 10 is in the locked state or the unlocked state.

The transmitter/receiver section 110 provides communication between the lockable space section 10 and the management device 20.

The safety checking device 120 is a device that checks for safety of the user 15 in response to an instruction from the management device 20. The safety checking device 120 may be a telephone or a device provided with a speaker and a microphone, for example. In a case where the acceptance management section 25 is an operator, the operator can check for safety the user 15 by operating and ringing the telephone. With a device provided with a speaker and a microphone, it is possible to check for safety of the user 15 by causing the acceptance management section 25 in which AI is implemented to output a mechanically generated call via the speaker and catching a response from the user 15 via the microphone. In a case where the safety checking device 120 is constituted by a speaker and a microphone, it is desirable that the safety checking device 120 be disposed in each space section used by the user 15. In a preferred embodiment, the call can be made in multiple languages. If a response is made in a foreign language, checking for safety is conducted in the foreign language.

The camera 130 is provided at or in the vicinity of the door of the lockable space section 10, and captures an image of a visitor. The image captured by the camera 130 is transmitted to the door control section 102. For example, in a case where an emergency staff 35 arrives at the lockable space section, an image of the emergency staff 35 is captured by the camera 130, the image thus captured is transmitted to the management device 20, and the image is displayed on the display section (reporting section, presenting section) 220. The acceptance management section 25 checks the image captured by the camera 130 and displayed on the display section 220, so as to confirm that the person who has arrived at the lockable space section 10 is the emergency staff 35.

The unlocking section 140 unlocks the door of the lockable space section 10 in response to an instruction of the door control section 102. For example, the acceptance management section 25 gives an unlocking instruction in the following manner. That is, the acceptance management section 25 operates an operation accepting section 240 to transmit the unlocking instruction to the lockable space section 10, Upon reception of the unlocking instruction, the door control section 102 of the control section 100 causes the unlocking section 140 to unlock the door of the lockable space section 10.

As shown in FIG. 3, the management device 20 includes a control section 200, a communication section (transmitter section) 210, a display section 220, a sound input/output section 230, and an operation accepting section 240.

The control section 200 includes an abnormality determination section (fallen-state determination section 2011, detecting section 2012) 201, a storage section 202, a remote unlocking section 203, an alarming section 204, a biological information presenting section 205, an arrival information presenting section 206, a safety checking section 207, and an obtaining section 208. The control section 200 stores, in its inside, various control programs to be executed by CPU, data thereof, and/or the like, and executes various processes in accordance with the programs.

The abnormality determination section 201 analyzes the sensing data obtained by the sensors 111 transmitted thereto from the lockable space section 10, and determines the presence or absence of an abnormality in the user 15 or the rearing animal. More specifically, among the sensors 111, the second sensor capable of sensing a behavior of the user 15 or the rearing animal is used to determine, on the basis of sensing data obtained by the second sensor, whether or not the user 15 or the rearing animal has fallen down and stays in the fallen state. If the user 15 or the rearing animal is in the fallen state, the first sensor capable of sensing the heart rate, the respiratory rate, and/or the like is used to determine, on the basis of sensing data obtained by the first sensor, whether or not there is a significant different between the heart rate, the respiratory rate, and/or the like of the user 15 or the rearing animal obtained at this time and those obtained in a normal condition. If a significant difference is detected, it is determined that an abnormality has occurred in the user 15 or the rearing animal. In order to determine the presence or absence of an abnormality, for example, sensing data (sensing data 2021) obtained may be stored in the storage section 202, and a determination is made as to whether or not there is a significant difference between the sensing data thus stored and sensing data obtained at this time. Alternatively, a threshold of the sensing data may be set. If the sensing data exceeds the threshold, it is possible to determine that there is an abnormality. In this case, the threshold may be stored in the storage section 202. The determination as to the presence or absence of an abnormality may be made by a learning model that uses, as learning data, normal data and abnormal data.

The storage section 202 may store, as data used to determine an abnormality, physical information (body-related data such as a height, a weight, a heart rate, an age, a sex, and/or a blood type, health examination data, and/or physical data such as data indicating that the user or the rearing animal is lame of a leg) of the user 15 or the rearing animal obtained when the user 15 or the rearing animal in a normal condition, medical history information (medical consultation history, physical constitution, with/without allergy, and/or data related to a household medicine and/or an inoculation drug) of the user 15 or the rearing animal, household energy consumption amount information (infrastructure use amount data, communication volume data) of the user 15 or the rearing animal, information indicative of a place for storage of a household medicine and/or a drug for an emergent treatment for allergy for the user 15 or the rearing animal, information indicative of an automated external defibrillator (AED) setting place for the user 15 or the rearing animal, behavior information (information indicative of a behavior pattern in association with the day of the week, the time zone, and/or the like) of the user 15 or the rearing animal. By using the physical information, the medical history information, the household energy consumption amount information, the behavior information, and/or the like, it is possible to set a criterion for determining whether or not there is an abnormality in the user 15 or the rearing animal. The purpose of use of these pieces of information is not limited to set the criterion for determining the presence or absence of an abnormality. Alternatively, these pieces of information can be used as learning data related to prediction of danger of a living body or health management.

In another preferred embodiment, the information of the vital data detected by the wearable sensor can also be used to determine the presence or absence of an abnormality. In a case where electrocardiogram information of the user 15 or the rearing animal wearing the wearable sensor is transmitted, as one example of the vital data, to the abnormality determination section 201, it is determined whether or not there is an abnormality while determining whether or not cautious arrhythmia is detected. This can improve accuracy in determination of an abnormality.

The description in Embodiment 1 will mainly discuss an example in which data obtained by various non-contact sensors, the wearable sensor, and/or the like are stored in the storage section 202 of the control section 200. However, a storage device in which the various data is stored is not limited to the storage section 202 of the control section 200. For example, the various data may be stored in the storage section 105 of the space section 10, a cloud server (not illustrated), and/or a sensor 111 having an edge computing function.

In accordance with the operation of the acceptance management section 25, the remote unlocking section 203 transmits, to the lockable space section 10, an instruction to remotely unlock the lockable space section 10. The remote unlocking is carried out in the following manner. That is, the instruction from the remote unlocking section 203 is notified to the unlocking section 140 via the communication section 210, and then the unlocking section 140 unlocks the door of the lockable space section 10. Thus, the remote unlocking section 203, the communication section 210, and the unlocking section 140 constitute the unlocking part.

Unlocking of the lock provided to the lockable space section 10 may be carried out remotely by an operation of the acceptance management section 25. However, this is not limitative. For example, in a case where a lock unlockable by a password is provided to the lockable space section 10, it is possible to employ a remote unlocking section 203 configured to transmit a one-time password to a mobile terminal possessed by the emergency staff 35 so as to allow the emergency staff 35 to unlock the lock with use of the password. Furthermore, the unlocking method is not limited to the above-described one-time password method, but may be an arbitrary one-time key method carried out via a mobile phone, a tablet computer, a dedicated terminal, or the like.

In Embodiment 1, each of the remote unlocking carried out by an operation of the acceptance management section 25 and the unlocking carried out by the emergency staff 35 with use of a one-time password may also be expressed as emergency unlocking. The emergency unlocking refers to unlocking different from normal unlocking. The normal unlocking encompasses unlocking ordinarily carried out by the user 15, for example, unlocking with a key, unlocking with a mobile terminal, and unlocking with a password. Meanwhile, the emergency unlocking is different from the normal unlocking such as those described above, and refers to unusual unlocking such as the remote unlocking carried out by an operation of the acceptance management section 25 or the unlocking carried out with use of a one-time password and/or the like.

If the abnormality determination section 201 determines that an abnormality has occurred in the user 15 or the rearing animal, the alarming section 204 causes the display section 220 to display a notification of the abnormality so as to notify the abnormality to the acceptance management section 25. In a case where the acceptance management section 25 is an operator, the alarming section 204 may be configured to illuminate a red lamp (not illustrated) and/or the like so as to notify the abnormality of the user 15 or the rearing animal to the operator. Alternatively, the alarming section 204 may be configured to cause the sound input/output section 230 to output a warning sound so as to notify the abnormality of the user 15 or the rearing animal to the operator. The alarming section 204 is not limited to the above-described aspect of illuminating the red lamp. Alternatively, the alarming section 204 encompasses indication on a monitor, a phone call on a mobile phone, and the like. The monitor is not limited to a fixed display, and may be a monitor such as a tablet computer or a dedicated terminal.

The biological information presenting section 205 obtains, from the lockable space section 10 via the communication section 210, the biological information of the user 15 or the rearing animal which biological information is detected by the first sensor 111*a*, and causes the display section 220 to display the biological information so as to present the biological information to the acceptance management section 25. As described above, the first sensor 111*a*, the communication section 210, the biological information presenting section 205, and the display section 220 constitute the biological information presenting part configured to present, to an operator 25, the biological information of the user 15 or the rearing animal.

The arrival information presenting section 206 obtains, from the lockable space section 10 via the communication section 210, an image (a still image, a moving image) captured by the camera 130 provided in the lockable space section 10, and causes the display section 220 to display the image. The camera 130 is provided at the entrance of the lockable space section 10, and is capable of capturing an image of a visitor. With this, the acceptance management section 25 can determine whether or not the person who has arrived at the lockable space section 10 is the emergency staff 35 through image analysis of the image (video). In a case where the acceptance management section 25 is an operator, the operator can make the determination through visual observation of the image (video). As described above, the camera 130, the communication section 210, the arrival information presenting section 206, and the display section 220 constitute the arrival information presenting part with which the acceptance management section 25 can determine whether or not the person who has arrived at the lockable space section 10 is the emergency staff 35.

The part configured to present the arrival information is preferably a monitor that displays an image such as those described above. The monitor is not limited to a fixed display, but may be a screen of a mobile phone, a screen of a tablet computer, or a screen of a dedicated terminal.

In a case where the location of the emergency staff 35 can be identified on the basis of GPS information of a mobile terminal possessed by the emergency staff 35, the arrival information presenting section 206 may use the GPS information to determine that the emergency staff 35 has arrived at the lockable space section 10 and present the information indicative of the arrival to the acceptance management section 25.

The safety checking section 207 checks for safety of the user 15 or the rearing animal. More specifically, in response to an instruction from the acceptance management section 25, the safety checking section 207 checks for safety of the user 15 or the rearing animal via the communication section 210. The checking for safety may be carried out in the following manner. That is, a sound given from the acceptance management section 25 through the sound input/output section 230 is given to the safety checking device 120 in the lockable space section 10 via the communication section 210, and is then output from the speaker of the safety checking device 120. A response from the user 15 is caught by the microphone of the safety checking device 120, and is output from the sound input/output section 230 via the communication section 210. In a case where the lockable space section 10 is a residence, speakers and microphones can be provided in two or more rooms. In such a case, the following aspect is also encompassed. That is, when the safety checking is output from the speaker of the safety checking device 120, a family member or the like who is not the user 15 and who is in another room notices the safety checking and gives a response to the microphone of the safety checking device 120. With this, the acceptance management section 25 can check for safety of the user 15.

With the configuration in which the camera is provided in the lockable space section 10 as one example of the image-capturing sensor and the safety checking section 207 obtains, via the communication section 210, an image captured by the camera and analyzes the image (by AI), it is possible to check for safety of the user 15 or the rearing animal. In a case where the acceptance management section 25 is an operator, the image may be displayed on the display section 220 so as to allow the operator to check for safety of the user 15 or the rearing animal.

For example, in a case where the user 15 wakes up in a bedroom, an illumination device that illuminates the bedroom or a foot area of a bed may be controlled in accordance with sensing information from a body motion sensor. With this, it is possible to improve accuracy in determination made on the basis of information of an image obtained at wake-up time.

In consideration of privacy of the user 15, the configuration in which the camera captures an image of the user 15 preferably employs a display device (not illustrated) with which the user 15 can visually recognize whether shooting of an image of the user 15 by the camera is currently being taking place. The display device may be mounted on the camera or may be provided independently of the camera. In addition, the configuration preferably further includes a switching device (not illustrated) that enables or disables an image-capturing operation of the camera. In another preferred embodiment, in consideration of privacy, only the skeleton of the user 15 can be displayed after the analysis of the captured image is done.

The communication section 210 provides communication between the management device 20 and the lockable space section 10.

The display section 220 is a display device that presents, to the acceptance management section 25, the state of the sensing data and/or the presence or absence of an abnormality. If the abnormality determination section 201 determines the presence of an abnormality, the display section 220 displays information indicative of the presence of the abnormality in response to an instruction from the alarming section 204.

The sound input/output section 230 can input and output a sound. For example, the sound input/output section 230 may be a microphone and a speaker. The acceptance management section 25 can check for safety of the user 15 in the following manner. That is, the acceptance management section 25 calls out to the user 15 via the microphone, and confirms, via the speaker, a response from the user 15.

The sound input/output section 230 may have a transmitter/receiver function of a telephone. That is, the management device 20 may additionally have a telephone function, and the acceptance management section 25 may make or receive a phone call via the sound input/output section 230. For example, emergency help may be requested via the sound input/output section 230.

The operation accepting section 240 accepts an operation carried out on the management device 20. For example, the operation accepting section 240 may be a keyboard and/or a mouse. The display section 220 and the operation accepting section 240 may be integrated together so as to constitute a touch panel, for example.

The checking for safety of the user 15 or the rearing animal may be carried out by an operation with respect to the operation accepting section 240. For example, in response to clicking, with a mouse or the like, a safety checking button displayed on the display section 220, information for checking safety of the user 15 or the rearing animal may be output from the safety checking device 120 in the lockable space section 10.

As described above, the safety checking system 1 in accordance with Embodiment 1 includes: the second sensor 111*b* provided in the lockable space section 10, the second sensor 111*b* being configured to detect falling-down of the user 15 or the rearing animal in the lockable space section 10 and to detect, after the falling-down, the presence or absence of a motion of the user 15 or the rearing animal having fallen down; the abnormality determination section 201 configured to determine whether or not the user 15 or the rearing animal is in a fallen state in accordance with sensing data obtained by the second sensor 111*b*; the first sensor 111*a* provided in the lockable space section 10, the first sensor 111*a* being configured to detect the heart rate and the respiratory rate of the user 15 or the rearing animal being in a fallen state; the abnormality determination section 201 further configured to compare sensing data obtained by the first sensor 111*a* with a preset numerical value to detect a significant difference between the heart rate and the respiratory rate obtained when the user 15 or the rearing animal is in the fallen state and those obtained when the user 15 or the rearing animal is in a normal condition; the display section 220 provided in a facility remote from the lockable space section 10, the display section 220 being configured to notify occurrence of an abnormality to the acceptance management section 25 provided in the facility; the alarming section 204 configured to cause the display section 220 to issue an alarm in a case where the abnormality determination section 201 detects the significant difference; the communication section 210 and the transmitter/receiver section 110 configured to provide communication between the acceptance management section 25 and the user 15 or the rearing animal in the lockable space section 10 to check for safety; the display section 220, provided in the facility, further configured to obtain the sensing data obtained by the second sensor 111*b* and to present the sensing data to the acceptance management section 25; the camera 130 provided in the lockable space section 10, the camera 130 being configured to capture an image of an emergency staff having arrived at the entrance of the lockable space section 10 in response to a dispatch request from the acceptance management section 25; the display section 220 further configured to obtain the image captured by the camera 130 and to present the image to the acceptance management section 25; and the remote unlocking section 203 configured to unlock, in response to an operation of the acceptance management section 25, the lock provided at the entrance of the lockable space section 10.

[Flow of Process Carried Out by Safety Checking System 1]

Figure 4:
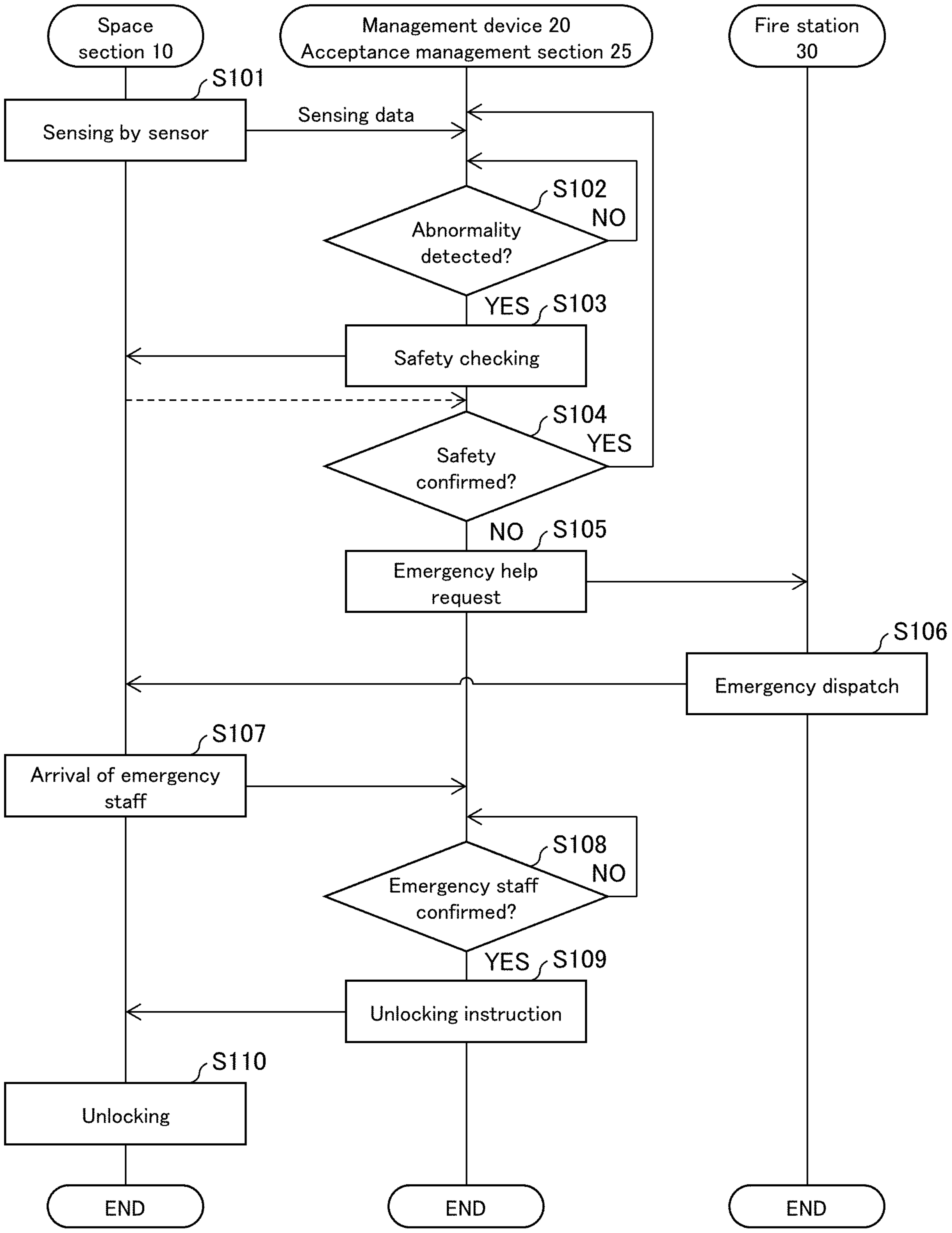
FIG. 4 is a flowchart illustrating a flow of a process carried out by the safety checking system.

Next, with reference to FIG. 4, the following will describe a flow of a process carried out by the safety checking system 1. FIG. 4 is a flowchart illustrating a flow of the process carried out by the safety checking system 1.

As shown in FIG. 4, in the safety checking system 1, the sensor(s) 111 provided in the lockable space section 10 first carries out sensing (S101; sensing step), and the information management section 101 transmits sensing data thus obtained to the management device 20. The management device 20 stores the sensing data in the storage section 202 (storing step). The sensor(s) 111 may execute the sensing constantly or at given intervals. In order to promptly detect an abnormality in the user 15 or the rearing animal, it is preferable that the sensor(s) 111 carry out the sensing constantly. A switching device (not illustrated) that enables or disables execution of the sensing by the sensor(s) 111 may be further included.

Upon obtaining of the sensing data, the management device 20 determines, via the abnormality determination section 201, the presence or absence of an abnormality in the sensing data (S102). For example, in accordance with the sensing data from the second sensor 111*b*, the abnormality determination section 201 determines whether or not the user 15 or the rearing animal is in a fallen state. Then, if the abnormality determination section 201 determines that the user 15 or the rearing animal is in the fallen state, the abnormality determination section 201 determines, on the basis of the sensing data from the first sensor 111*a*, whether or not a significant difference is found between the biological information such as the heart rate, the respiratory rate, and/or the like obtained from the user 15 or the rearing animal at this time and that obtained in a normal condition (detecting step). If a significant difference is found between the biological information obtained from the user 15 or the rearing animal at this time and that obtained in the normal condition, the abnormality determination section 201 determines that an abnormality has occurred in the user 15 or the rearing animal.

If the abnormality determination section 201 determines that there is an abnormality, that is, if an abnormality has found in the sensing data (YES in S102), the presence of the abnormality is notified to the acceptance management section 25 (alarming step). Then, the acceptance management section 25 checks for safety of the user 15 or the rearing animal (S103; safety checking step). The checking for safety can be carried out by analysis of an image of the user 15 or the rearing animal carried out by the acceptance management section 25. Alternatively, in a case where the acceptance management section 25 is an operator, the checking for safety is preferably carried out by the operator calling out to the user 15. The acceptance management section 25 may check, on the basis of the sensing data from the second sensor 111*b*, whether or not the user 15 or the rearing animal stays still in the fallen state. If safety of the user 15 or the rearing animal is confirmed as a result of the checking for safety (YES in S104), the process returns to step S101. Meanwhile, if safety of the user 15 or the rearing animal cannot be confirmed (NO in S104), the acceptance management section 25 requests an emergency agency for emergency help (S105). Particularly in a case where safety of the user 15 cannot be confirmed (NO in S104), the acceptance management section 25 requests a fire station 30 for emergency help (S105). Then, when an emergency staff 35 is dispatched from the fire station 30 (S106) and arrives at the lockable space section 10 used by the user 15 or the rearing animal (S107), a call button is pressed and an image of the visitor is captured by the camera 130 provided in the lockable space section 10. The image thus captured is transmitted to the management device 20. On the basis of the image captured by the camera 130, the acceptance management section 25 determines whether or not the visitor who has arrived at the lockable space section 10 is the emergency staff 35 (S108; arrival information presenting step). Note that the transmission of the image captured by the camera 130 to the management device 20 may be started when the abnormality determination section 201 determines the presence of the abnormality. Alternatively, the transmission of the image captured by the camera 130 to the management device 20 may be carried out on the basis of a determination that the acceptance management section 25 makes together with the determination of the presence of the abnormality. The transmission of the image captured by the camera 130 to the management device 20 may be ended when the lock of the lockable space section 10 is remotely unlocked by the acceptance management section 25.

If it is determined that the visitor is an emergency staff (YES in S108), the acceptance management section 25 transmits, to the lockable space section 10, an instruction for unlocking the door of the lockable space section 10 which instruction is given by the management device 20 (S109). Upon reception of the unlocking instruction from the management device 20, the door control section 102 in the lockable space section 10 controls the unlocking section 140 to unlock the door of the lockable space section 10 (S110: unlocking step).

With this, it is possible to promptly dispatch the emergency staff 35 to the user 15 or the rearing animal when an abnormality occurs in the user 15 or the rearing animal.

The description above has discussed the configuration in which the management device 20 includes the abnormality determination section 201. Alternatively, the process to be carried out by the abnormality determination section 201 may be carried out in the lockable space section 10. That is, the control section 100 of the residence 10 may include an abnormality determination section 103 (fallen-stated determination section 1031, detecting section 1032) and a storage section 105 in which sensing data 1051 is stored, and the abnormality determination section 103 may carry out the same function as the abnormality determination section 201.

Embodiment 2

The following description will discuss another embodiment of the present invention. For convenience, members having identical functions to those of Embodiment 1 are given identical reference signs, and their descriptions will be omitted.

Figure 2:
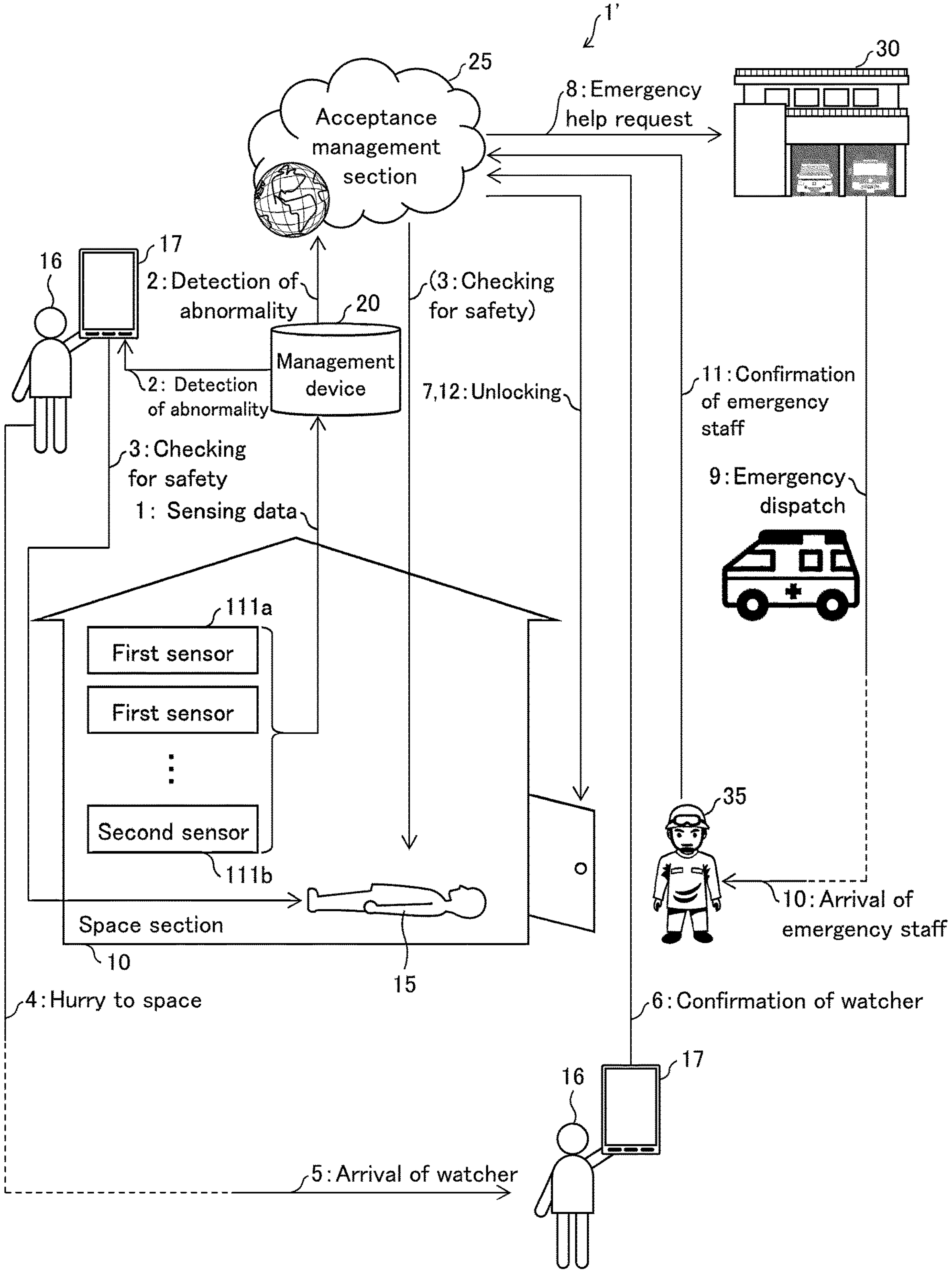
FIG. 2 is a view illustrating an overview of a safety checking system in accordance with another embodiment of the present invention.

With reference to FIG. 2, the following description will discuss an overview of a safety checking system 1' in accordance with Embodiment 2. FIG. 2 is a view illustrating the overview of the safety checking system 1'. As shown in FIG. 2, the safety checking system 1' includes a lockable space section 10 that is used by a user 15 or a rearing animal, a management device 20 of a management company, an information terminal 17 possessed by a watcher 16, and an acceptance management section 25. In the safety checking system 1' shown in FIG. 2, the information terminal 17 possessed by the watcher 16 and the acceptance management section 25 are indicated as separated aspects. Alternatively, in one aspect, the information terminal 17 possessed by the watcher 16 may function also as the acceptance management section 25. In Embodiment 2, the watcher 16 who can check for an abnormality may be a parent, a relative, a neighbor, or a guardian who lives apart from the user. However, this is not limitative. The information terminal 17 possessed by the watcher 16 preferably has the same function as that of the acceptance management section 25, and the watcher 16 also corresponds to an operator. That is, an entity that checks for an abnormality is not limited to an operator and/or AI, but may also be an arbitrary person who can serve as the watcher 16.

The following description will discuss details of a configuration and a function of the information terminal 17 that is possessed by the watcher 16 and that functions as one aspect of the acceptance management section 25. Configurations of the parts other than the information terminal 17 possessed by the watcher 16 are the same as those of the safety checking system 1 shown in FIG. 1, and their description will be omitted.

Similarly to the safety checking system 1, the safety checking system 1' in accordance with Embodiment 2 is configured such that the state of the user 15 or the rearing animal using the lockable space section 10 is sensed by various sensor(s) 111 provided in the lockable space section and sensing data thus obtained is transmitted to the management device 20. If the management device 20 determines the presence of an abnormality, the management device 20 notifies the presence of the abnormality to the information terminal 17 that is possessed by the watcher 16 and that functions as one aspect of the acceptance management section 25. For convenience, FIG. 2 shows an aspect in which the management device 20 gives a notification to the acceptance management section 25 and the information terminal 17 possessed by the watcher 16 (2: detection of abnormality).

Via the information terminal 17, the watcher 16 checks for safety of the user 15 or the rearing animal in the lockable space section 10 (3: checking for safety). If the watcher 16 cannot confirm safety of the user 15 or the rearing animal, the watcher 16 requests an emergency agency for emergency help (8: emergency help request). In a case where safety of the user 15 cannot be confirmed, it is preferable to request a fire station 30 for emergency help. In a case where safety of the rearing animal cannot be confirmed, it is preferable to request a veterinary hospital or the like for emergency help.

If safety of the user 15 or the rearing animal cannot be confirmed, the watcher 16 can hurry to the lockable space section 10 used by the user 15 or the rearing animal (4: hurry to space). When the watcher 16 arrives at the lockable space section 10 (5: arrival of watcher), the acceptance management section 25 confirms, with the camera 130 provided in the lockable space section 10, that the person who has arrived at the lockable space section 10 is the watcher 16, and remotely unlocks the door of the lockable space section 10. As a result of unlocking, the watcher 16 can promptly check the state of the user 15 or the rearing animal.

At the time when an emergency staff arrives at the lockable space section (10: arrival of emergency staff) in response to the emergency help request, the door of the lockable space section 10 is already unlocked. Thus, the emergency staff can handle the case promptly. Even in a case where the door of the space section 10 is locked by, e.g., automatic locking when the emergency staff 35 arrives at the space section 10, the space section 10 can be unlocked by the acceptance management section 25 in the same similar manner as in Embodiment 1.

The language indicated in the management device 20, the language indicated on the information terminal 17 of the watcher 16, and the language indicated on the later-described mobile terminal (terminal) 400 of the emergency staff 35 are not limited to Japanese, and may be any language other than Japanese.

[Flow of Process Carried Out by Safety Checking System 1']

Figure 5:
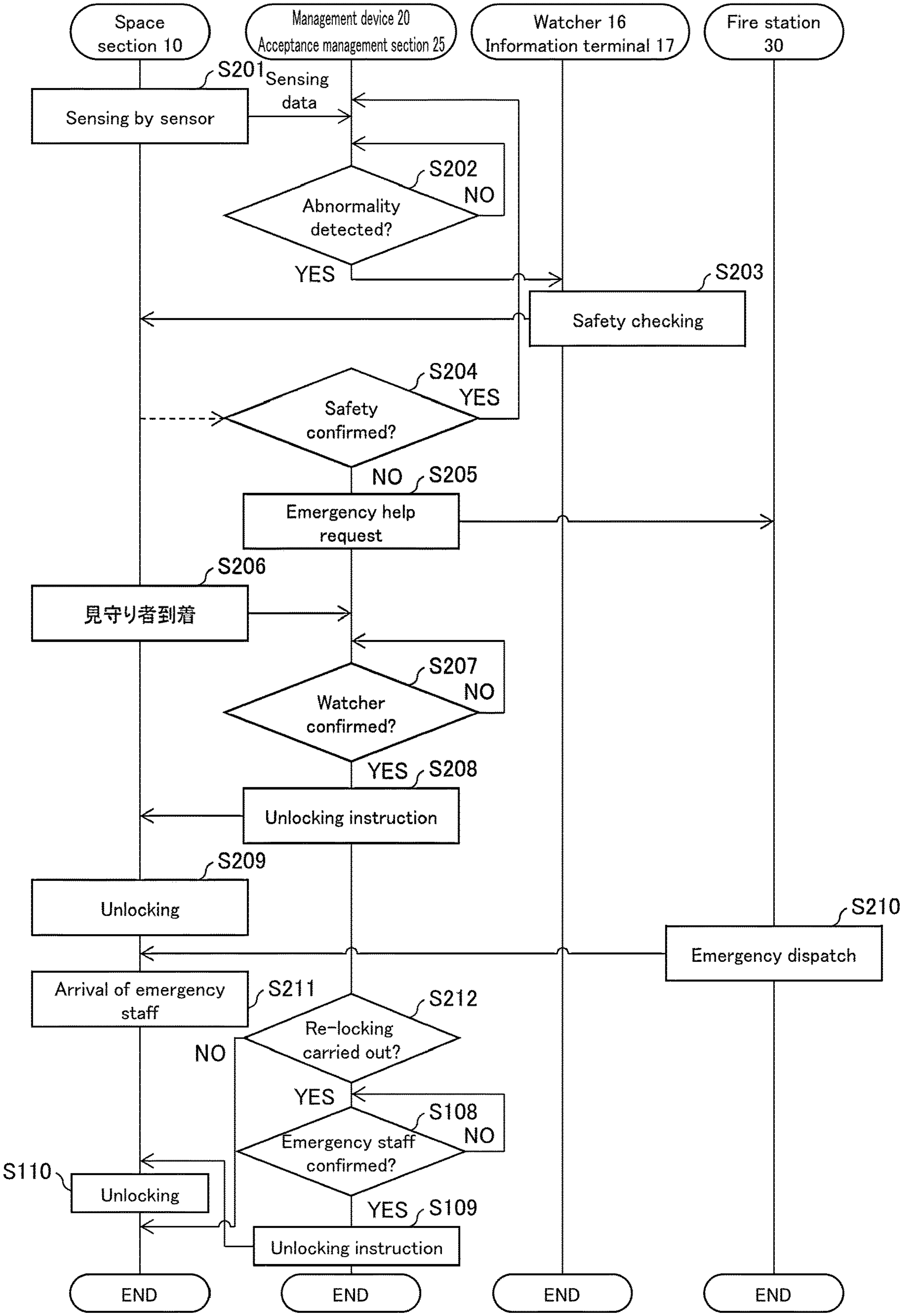
FIG. 5 is a flowchart illustrating a flow of a process carried out by the safety checking system in accordance with another embodiment of the present invention.

Next, with reference to FIG. 5, the following will describe a flow of a process carried out by the safety checking system 1'. FIG. 5 is a flowchart illustrating a flow of the process carried out by the safety checking system 1'.

As shown in FIG. 5, in the safety checking system 1', the sensor(s) 111 provided in the lockable space section 10 first carries out sensing (S201; sensing step), and the information management section 101 transmits sensing data thus obtained to the management device 20. The management device 20 stores the sensing data in the storage section 202 (storing step). The sensor(s) 111 may execute the sensing constantly or at given intervals.

Upon obtaining of the sensing data, the management device 20 determines, via the abnormality determination section 201, the presence or absence of an abnormality in the sensing data (S202). If the abnormality determination section 201 determines that there is an abnormality, the abnormality determination section 201 determines, on the basis of the sensing data from the first sensor 111*a*, whether or not a significant difference is found between the biological information of the user 15 or the rearing animal obtained at this time and that obtained in a normal condition (detecting step). If a significant difference is found between the biological information of the user 15 or the rearing animal obtained at this time and that obtained in the normal condition, the abnormality determination section 201 determines that an abnormality has occurred in the user 15 or the rearing animal.

If the abnormality determination section 201 determines that there is an abnormality, that is, if an abnormality has found in the sensing data (YES in S202), the presence of the abnormality is notified to the information terminal 17 that is possessed by the watcher 16 as one aspect of the acceptance management section 25 (alarming step). Then, the watcher 16 checks for safety of the user 15 or the rearing animal (S203; safety checking step). The checking for safety can be carried out by the information terminal 17 checking an image of the user 15 or the rearing animal. The checking for safety is also preferably carried out by the watcher 16 calling out to the user 15. If safety of the user 15 or the rearing animal is confirmed as a result of the checking for safety (YES in S204), the process returns to step S201. Meanwhile, if safety of the user 15 or the rearing animal cannot be confirmed (NO in S204), the acceptance management section 25 requests an emergency agency for emergency help (S205). The flowchart shown in FIG. 5 illustrates the aspect in which the acceptance management section 25 requests an emergency agency for emergency help. Alternatively, the watcher 16 may request the emergency agency for emergency help.

The watcher 16 can hurry to the lockable space section 10 used by the user 15 or the rearing animal. When the watcher 16 arrives at the lockable space section 10 used by the user 15 or the rearing animal (S206), a call button is pressed and an image of the visitor is captured by the camera 130 provided in the lockable space section 10. The image thus captured is transmitted to the management device 20. On the basis of the image captured by the camera 130, the acceptance management section 25 determines whether or not the visitor who has arrived at the lockable space section 10 is the watcher 16 (S207; arrival information presenting step).

If it is determined that the visitor is the watcher 16 (YES in S207), the acceptance management section 25 transmits, to the lockable space section 10, an instruction for unlocking the door of the lockable space section 10 which instruction is given by the management device 20 (S208). Upon reception of the unlocking instruction from the management device 20, the door control section 102 in the lockable space section 10 controls the unlocking section 140 to unlock the door of the lockable space section 10 (S209: unlocking step).

This enables prompt dispatch of the emergency staff 35 to the user 15 or the rearing animal when an abnormality occurs in the user 15 or the rearing animal. The emergency staff 35 is dispatched (S210) in response to emergency help request (S205), and the door of the lockable space section 10 can be unlocked (S209) before the emergency staff 35 arrives at the space section 10 (S211). Even in a case where the door of the space section 10 is locked by, e.g., automatic locking when the emergency staff 35 arrives at the space section 10, the space section 10 can be unlocked by the acceptance management section 25 in the same similar manner as in Embodiment 1. For example, in a case where the acceptance management section 25 is an operator, the operator can determine (S212), from the lock state information displayed on the display section 220, whether or not re-locking by, e.g., automatic locking has been carried out after unlocking (S209). In a case where the acceptance management section 25 is integrated and implemented in the management device 20, the acceptance management section 25 can determine (S212), on the basis of the lock control information received via the communication section 210, whether or not re-locking by, e.g., automatic locking has been carried out after unlocking (S209). If the acceptance management section 25 determines that re-locking has not been carried out (NO in S212), the door of the lockable space section 10 is in an unlocked state and therefore the emergency staff 35 can promptly respond to the abnormality. If the acceptance management section 25 determines that re-locking has been carried out (YES in S212), unlocking can be carried out by the acceptance management section 25 in the same manner as in Embodiment 1 (S108 to S110). In another preferred embodiment, when the emergency staff 35 arrives at the lockable space section 10 (S211), it is possible to determine whether or not re-locking by, e.g., automatic locking has been carried out. If re-locking has not been carried out, the door of the lockable space section 10 is in an unlocked state and therefore the emergency staff 35 can promptly respond to the abnormality. If re-locking has been carried out, unlocking can be carried out by the acceptance management section 25 in the same manner as in Embodiment 1 (S108 to S110).

In addition, after emergency handling is carried out, the acceptance management section 25 can lock the lock in response to the locking request, and can notify the information terminal 17 and/or the like that the emergency handling is done.

Embodiment 3

The following description will discuss another embodiment of the present invention. For convenience, members having identical functions to those of Embodiments 1 and 2 are given identical reference signs, and their descriptions will be omitted.

In Embodiment 3, an emergency staff 35 possesses a mobile terminal (terminal) 400, and causes the mobile terminal 400 to present guidance information used for a guidance to the location of a user 15 or a rearing animal in a lockable space section 10. Even when the emergency staff 35 can arrive at the lockable space section 10 used by the user 15 or the rearing animal, the emergency staff 35 should search what part of the lockable space section 10 the user 15 or the rearing animal resides. If the situation requires prompt action, this searching time can cause a life-or-death matter. In order to deal with this, in Embodiment 3, the mobile terminal 400 possessed by the emergency staff 35 is caused to present the guidance information indicative of the location of the user 15 or the rearing animal in the lockable space section 10. This can promptly guide the emergency staff 35 to the location of the user 15 or the rearing animal, thereby reducing the wasteful searching time.

Preferably, the mobile terminal 400 is caused to further present the physical information of the user 15 or the rearing animal in a normal condition, the medical history information of the user 15 or the rearing animal, the environmental information (floor plan data, temperature, combustible gas concentration, carbon monoxide concentration, the presence or absence of a fire) of the space section 10, and/or the like. The mobile terminal 400 may be caused to further present information indicative of a place for storage of a household medicine and/or a drug for an emergent treatment for allergy, information indicative of an AED setting place, and/or the like.

In another preferred embodiment, light of a warning light, a guide light, and/or the like may be used to promptly guide the emergency staff 35. The guide light may be an independent optical device that can be controlled by the notifying section 104. Alternatively, in one aspect, in a case of emergency, an ordinary illumination device may emit guide light under control of the notifying section 104.

Figure 6:
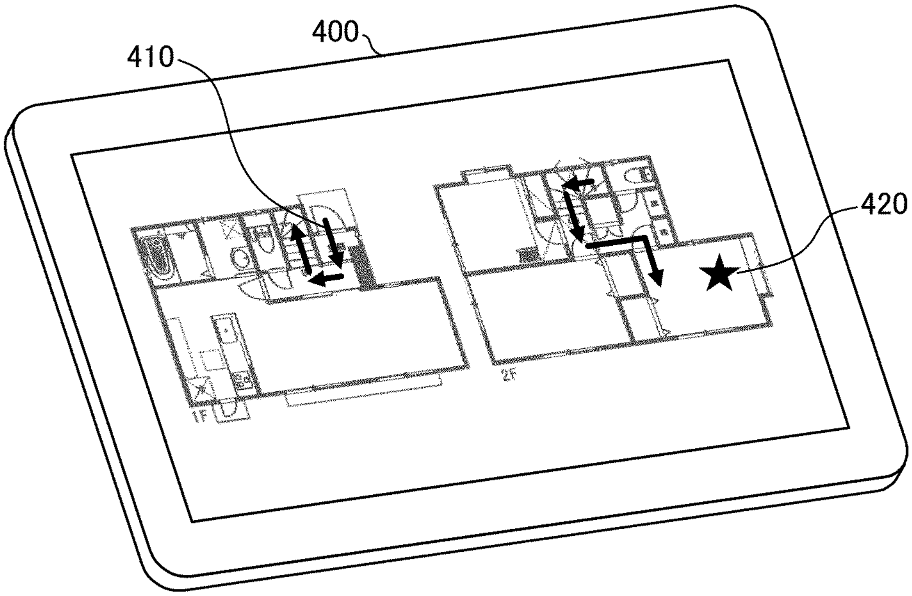
FIG. 6 is a view illustrating an example of guidance information presented to an emergency staff in another embodiment of the present invention.

FIG. 6 shows an example of the guidance information. In the example shown in FIG. 6, the mobile terminal 400 indicates the floor plan of the lockable space section 10 and the arrows indicating a route from an entrance 410 to the location 420 of the user 15 or the rearing animal. With this, the emergency staff 35 can recognize, at a glance, the location of the user 15 or the rearing animal.

Note that the floor plan of the lockable space section 10 may be stored in advance in the management device 20. With this, it is possible to generate the guidance information by determining the location of the user 15 or the rearing animal on the basis of the sensing data. By transmitting the guidance information from the management device 20 to the mobile terminal 400, it is possible to cause the mobile terminal 400 to present the guidance information.

More specifically, the storage section 202 of the management device 20 stores therein pieces of drawing data respectively indicating the floor plan of the lockable space section 10 and the location (room) where the second sensor 111*b* is disposed. The management device 20 includes a guidance information generating section configured to generate guidance information on the basis of (i) the location of the second sensor 111*b* corresponding to the room where the user 15 or the rearing animal has fallen down which location is determined on the basis of the sensing data obtained by the second sensor 111*b* and (ii) the floor plan. Then, the management device 20 transmits, via the communication section 210, the guidance information to the mobile terminal 400 possessed by the emergency staff 35.

As described above, the safety checking system 1 in accordance with Embodiment 3 includes: the second sensors 111*b* respectively provided in a plurality of rooms in a residence 10; a storage section configured to store pieces of drawing data respectively indicating the floor plan of the lockable space section 10 and the locations of the second sensors 111*b*; and the communication section 210 configured to transmit guidance information to the mobile terminal 400 possessed by the emergency staff 35, the guidance information being generated based on the sensing data obtained by the second sensors 111*b* and the drawing data, the guidance information indicating a route to a room where the user 15 or the rearing animal in a fallen state resides. The guidance information may be information indicating, on the floor plan of the lockable space section 10, a route from the entrance of the lockable space section 10 to the location of the user 15 or the rearing animal in a fallen state.

Aspects of the present invention can also be expressed as follows:

A method in accordance with a first aspect of the present invention for emergently responding to an abnormality in a living body of a user or a rearing animal using a space section that is lockable is a method including: an obtaining step of obtaining, via a management device, sensing data from a sensor that detects biological information of the user or the rearing animal using the space section that is lockable; a detecting step of detecting, via the management device, a significant difference between (i) the sensing data thus obtained and (ii) sensing data obtained in a normal condition or a threshold of the sensing data; an emergency help requesting step of requesting, upon detection of the significant difference as necessary, dispatch of an emergency agency to the space section that is lockable; an arrival confirming step of confirming, via the management device, whether the emergency agency having received the request has arrived at the space section that is lockable; and an unlocking step of causing the management device to issue a signal for carrying out emergency unlocking of a lock provided in the space section that is lockable.

A method in accordance with a second aspect of the present invention for emergently responding to an abnormality in a living body of a user or a rearing animal using a space section that is lockable may be configured such that, in the first aspect, the emergency help requesting step checks for safety of the user or the rearing animal before requesting the dispatch.

A method in accordance with a third aspect of the present invention for emergently responding to an abnormality in a living body of a user or a rearing animal using a space section that is lockable may be configured such that, in the second aspect, during checking for safety, the emergency help requesting step obtains the significant difference and presents the significant difference via the management device.

A method in accordance with a fourth aspect of the invention for emergently responding to an abnormality in a living body of a user or a rearing animal using a space section that is lockable is a method including: an obtaining step of obtaining, via a management device, sensing data from a sensor that detects biological information of the user or the rearing animal using the space section that is lockable; a detecting step of detecting, via the management device, a significant difference between (i) the sensing data thus obtained and (ii) sensing data obtained in a normal condition or a threshold of the sensing data; an alarming step of giving a notification of an abnormality to a watcher upon detection of the significant difference; an arrival confirming step of confirming, via the management device, whether the watcher having received the notification has arrived at the space section that is lockable; and an unlocking step of causing the management device to issue a signal for carrying out emergency unlocking of a lock provided in the space section that is lockable.

A safety checking system in accordance with a fifth aspect of the invention includes: a first sensor provided in a space section that is lockable and that allows a user or a rearing animal to go in and out, the first sensor being configured to detect biological information of the user or the rearing animal using the space section; a storage section configured to store at least a threshold of the biological information or sensing data obtained by the first sensor; a detecting section configured to compare sensing data obtained by the first sensor with the threshold or the sensing data stored in the storage section to detect an abnormality; a communication section configured to provide communication between the space section and the acceptance management section; an alarming section configured to cause a reporting section to issue an alarm in a case where the detecting section detects the abnormality, the reporting section being configured to report occurrence of an abnormality to the acceptance management section via the communication section; an arrival information presenting part configured to present, to the acceptance management section, arrival of an emergency agency at the lockable space section, the emergency agency being dispatched in response to a dispatch request from the acceptance management section; and an unlocking part configured to carry out, in response to an unlocking request from the acceptance management section, emergency unlocking of a lock provided to the lockable space section.

A safety checking system in accordance with a sixth aspect of the invention includes: a first sensor provided in a space section that is lockable and that allows a user or a rearing animal to go in and out, the first sensor being configured to detect biological information of the user or the rearing animal using the space section; a storage section configured to store at least a threshold of the biological information or sensing data obtained by the first sensor; a detecting section configured to compare sensing data obtained by the first sensor with the threshold or the sensing data stored in the storage section to detect an abnormality; a communication section configured to provide communication between at least the space section and an information terminal of a watcher of the user or the rearing animal; an alarming section configured to cause a reporting section to issue an alarm in a case where the detecting section detects the abnormality, the reporting section being configured to report occurrence of an abnormality to the information terminal via the communication section; an arrival information presenting part configured to present, to the acceptance management section, arrival of the watcher at the space section; and an unlocking part configured to carry out, in response to an unlocking request from the acceptance management section, emergency unlocking of a lock provided to the lockable space section.

A safety checking system in accordance with a seventh aspect of the present invention may be configured such that, in the sixth aspect, the safety checking system further includes: a safety checking section configured to carry out, via the communication section, communication between the acceptance management section and the user so as to carry out the checking for safety.

A safety checking system in accordance with an eighth aspect of the present invention may be configured such that, in the sixth or seventh aspect, the safety checking system further includes: a biological information presenting section provided in the space section that is lockable, the biological information presenting section being configured to obtain information indicative of presence or absence of the abnormality via the communication section and to present the information to the acceptance management section.

A management device in accordance with a ninth aspect of the present invention is a management device that is communicable with a space section via a telecommunications line, the space section being remotely lockable, the management device including: an obtaining section provided in the space section that is lockable, the obtaining section being configured to obtain sensing data from a first sensor that detects biological information of a user or a rearing animal using the space section that is lockable; a detecting section configured to detect an abnormality on a basis of (i) the sensing data obtained by the first sensor and (ii) biological information of the user or the rearing animal using the space section that is lockable which biological information is obtained in a normal condition or a threshold of the biological information; an alarming section configured to cause a reporting section to issue an alarm in a case where the detecting section detects the abnormality, the reporting section being configured to report occurrence of an abnormality; an arrival information presenting section configured to present information indicative of arrival of an emergency agency at the space section that is lockable, the emergency agency being dispatched in response to a dispatch request from an acceptance management section of the management device; and an unlocking section configured to carry out, in response to an unlocking request from the acceptance management section, emergency unlocking of a lock provided to the space section that is lockable.

A management device in accordance with a tenth aspect of the present invention is a management device that is communicable with a space section via a telecommunications line, the space section being remotely lockable, the management device including: an obtaining section provided in the space section that is lockable, the obtaining section being configured to obtain sensing data from a first sensor that detects biological information of a user or a rearing animal using the space section that is lockable; a detecting section configured to detect an abnormality on a basis of (i) the sensing data obtained by the first sensor and (ii) biological information of the user or the rearing animal using the space section that is lockable which biological information is obtained in a normal condition or a threshold of the biological information; an alarming section configured to cause a reporting section to issue an alarm in a case where the detecting section detects the abnormality, the reporting section being configured to report occurrence of an abnormality; an arrival information presenting section configured to present, in response to the alarm, information indicative of arrival of a watcher at the space section that is lockable; and an unlocking section configured to carry out, in response to an unlocking request from an acceptance management section, emergency unlocking of a lock provided to the space section that is lockable.

A management device in accordance with an eleventh aspect of the present invention may be configured such that, in the ninth or tenth aspect, the management device further includes: a safety checking section configured to communicate with the user to check for safety of the user, the user using the space section that is lockable.

A management device in accordance with a twelfth aspect of the present invention may be configured such that, in the tenth or eleventh aspect, the management device further includes: a biological information presenting section configured to obtain information indicative of presence or absence of the abnormality and to present the information to the acceptance management section.

A management device in accordance with a thirteenth aspect of the present invention may be configured such that, in any one of the ninth or twelfth aspect, the obtaining section is further configured to obtain sensing data from a second sensor provided in the space section that is lockable, the second sensor being configured to detect falling-down of the user in the space section that is lockable and to detect, after the falling-down, presence or absence of a motion of the user having fallen down, and the detecting section is further configured to detect presence or absence of an abnormality in the biological information of the user having fallen down.

A space section that is lockable in accordance with a fourteenth aspect of the present invention includes: a first sensor configured to detect biological information of a user or a rearing animal using the space section that is lockable; a second sensor configured to detect falling-down of the user or the rearing animal in the space section that is lockable and to detect, after the falling-down, presence or absence of a motion of the user or the rearing animal having fallen down; a detecting section configured to determine whether or not the user or the rearing animal having fallen down moves after the falling-down on a basis of sensing data obtained by the second sensor and to detect presence or absence of an abnormality on a basis of (i) sensing data obtained by the first sensor and (ii) biological information of the user or the rearing animal having fallen down which biological information is obtained in a normal condition or a threshold of the biological information; and a notifying section configured to externally notify occurrence of the abnormality in a case where the detecting section detects the abnormality.

A method in accordance with a fifteenth aspect of the present invention for controlling a management device is a method for controlling a management device that is communicable with a space section via a telecommunications line, the space section being remotely lockable, the method including: an obtaining step of obtaining sensing data from a first sensor provided in the space section that is lockable, the first sensor being configured to detect biological information of a user or a rearing animal using the space section that is lockable; a detecting step of detecting presence or absence of an abnormality on a basis of (i) the sensing data obtained by the first sensor and (ii) biological information of the user or the rearing animal using the space section that is lockable which biological information is obtained in a normal condition or a threshold of the biological information; an alarming step of causing a reporting section to issue an alarm in a case where the abnormality is detected in the detecting step, the reporting section being configured to report occurrence of an abnormality; an arrival information presenting step of presenting information indicative of arrival of an emergency agency at the space section that is lockable, the emergency agency being dispatched in response to a dispatch request from an acceptance management section of the management device; and an unlocking step of carrying out, in response to an unlocking request from the acceptance management section, emergency unlocking of a lock provided at an entrance of the space section that is lockable.

A method in accordance with a sixteenth aspect of the present invention for controlling a management device is a method for controlling a management device that is communicable with a space section via a telecommunications line, the space section being remotely lockable, the method including: an obtaining step of obtaining sensing data from a first sensor provided in the space section that is lockable, the first sensor being configured to detect biological information of a user or a rearing animal using the space section that is lockable; a detecting step of detecting presence or absence of an abnormality on a basis of (i) the sensing data obtained by the first sensor and (ii) biological information of the user or the rearing animal using the space section that is lockable which biological information is obtained in a normal condition or a threshold of the biological information; an alarming step of causing a reporting section to issue an alarm in a case where the abnormality is detected in the detecting step, the reporting section being configured to report occurrence of an abnormality; an arrival information presenting step of presenting, in response to the alarm, information indicative of arrival of a watcher at the space section that is lockable; and an unlocking step of carrying out, in response to an unlocking request from an acceptance management section, emergency unlocking of a lock provided at an entrance of the space section that is lockable.

A method in accordance with a seventeenth aspect of the present invention for controlling a management device may be configured such that, in the fifteenth or sixteenth aspect, the method further includes: a safety checking step of communicating with the user so as to carry out the checking for safety, the user using the space section that is lockable.

A method in accordance with an eighteenth aspect of the present invention for controlling a management device may be configured such that, in the sixteenth or seventeenth aspect, the method further includes: a biological information presenting step of obtaining information indicative of presence or absence of the abnormality and presenting the information to the acceptance management section.

[Software Implementation Example]

Control blocks (particularly, the information management section 101 and the door control section 102 of the control section 100 and the abnormality determination section 201 of the control section 200) included in the safety checking system 1 can be realized by a logic circuit (hardware) provided in an integrated circuit (IC chip) or the like or can be alternatively realized by software.

In the latter case, the safety checking system 1 includes a computer that executes instructions of a program that is software realizing the foregoing functions. The computer, for example, includes at least one processor and at least one computer-readable storage medium storing the program. An object of the present invention can be achieved by the processor of the computer reading and executing the program stored in the storage medium. Examples of the processor encompass a central processing unit (CPU). Examples of the storage medium encompass a "non-transitory tangible medium" such as a read only memory (ROM), a tape, a disk, a card, a semiconductor memory, and a programmable logic circuit. The computer may further include a random access memory (RAM) or the like in which the program is loaded. Further, the program may be made available to the computer via any transmission medium (such as a communication network and a broadcast wave) which allows the program to be transmitted. Note that an aspect of the present invention can also be achieved in the form of a computer data signal in which the program is embodied via electronic transmission and which is embedded in a carrier wave.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1: Safety checking system
10: Space section that is lockable (Lockable space section)
15: User
17: Information terminal
20: Management device
25: Reception management section
30: Fire station
35: Emergency staff
100, 200: Control section
101: Information management section
102: Door control section
103, 201: Abnormality determination section
104: Notifying section
105, 202: Storage section
110: Transmitter/receiver section
111: Sensor (111*a*: first sensor, 111*b*: second sensor)
120: Safety checking device
130: Camera (image capturing section)
140: Unlocking section
201: Abnormality determination section (fallen-state determination section, detecting section)
202: Storage section
203: Remote unlocking section
204: Alarming section
205: Biological information presenting section
206: Arrival information presenting section
207: Safety checking section
208: Obtaining section
210: Communication section (transmitter section)
220: Display section (reporting section)
230: Sound input/output section
240: Operation accepting section
400: Mobile terminal
1031, 2011: Fallen-state determination section
1031: Fallen-stated determination section
1032, 2012: Detecting section
1051, 2021: Sensing data

The invention claimed is:

1. A method for emergently responding to an abnormality in a living body of a user or a rearing animal using a space section that is lockable, said method comprising:

an obtaining step of obtaining, via a management device, sensing data from a first sensor that detects biological information of the user or the rearing animal using the space section that is lockable and obtaining sensing data from a second non-contact sensor that detects falling-down of the user or the rearing animal in the space section that is lockable and detects, after the falling-down, presence or absence of a motion of the user or the rearing animal having fallen down;

a detecting step of detecting an abnormality by comparing the sensing data from the first sensor with a threshold of the biological information, via the management device, a significant difference between (i) the sensing data thus obtained and (ii) sensing data obtained in a normal condition or a threshold of the sensing data and detecting using the second sensor that said user has fallen down and stayed in a fallen down state, determining that the abnormality is present when both the significant difference between (i) the sensing data thus obtained and (ii) sensing data obtained in a normal condition or a threshold of the sensing data and the detecting that user has stayed in a fallen down state are detected;

an emergency help requesting step of requesting, upon detection of the abnormality as necessary, dispatch of an emergency agency to the space section that is lockable;

an arrival confirming step of confirming, by the management device and in response to an image from a camera provided at the lockable space section or GPS information of a mobile terminal possessed by an emergency staff, whether the emergency agency having received the request has arrived at the space section that is lockable; and an unlocking step of causing the management device to issue a signal for carrying out emergency unlocking of a lock provided in the space section that is lockable, and.

2. The method as set forth in claim 1, wherein during checking for safety, the emergency help requesting step obtains the abnormality and presents the abnormality via the management device.

3. A method for emergently responding to an abnormality in a living body of a user or a rearing animal using a space section that is lockable, said method comprising:

an obtaining step of obtaining, via a management device, sensing data from a first sensor that detects biological information of the user or the rearing animal using the space section that is lockable and obtaining sensing data from a second non-contact sensor that detects falling-down of the user or the rearing animal in the space section that is lockable and detects, after the falling-down, presence or absence of a motion of the user or the rearing animal having fallen down;

a detecting step of detecting an abnormality by comparing the sensing data from the first sensor with a threshold of the biological information and detecting using the second sensor that said user has fallen down and stayed in a fallen down state, determining that the abnormality is present when both the significant difference between (i) the sensing data thus obtained and (ii) sensing data obtained in a normal condition or a threshold of the sensing data and the detecting that user has stayed in a fallen down state are detected;

an alarming step of giving a notification of the abnormality to a watcher upon detection of the significant difference;

an arrival confirming step of confirming, by the management device, and in response to an image from a camera provided at the lockable space section, whether the watcher having received the notification has arrived at the space section that is lockable; and an unlocking step of causing the management device to issue a signal for carrying out emergency unlocking of a lock provided in the space section that is lockable, wherein.

4. A safety checking system comprising:

a first sensor provided in a space section that is lockable and that allows a user or a rearing animal to go in and out, the first sensor being configured to detect biological information of the user or the rearing animal using the space section;

a second non-contact sensor that detects falling-down of the user or the rearing animal in the space section that is lockable and detects, after the falling-down, presence or absence of a motion of the user or the rearing animal having fallen down to determine if the user has stayed in a fallen down state;

a storage section configured to store at least a threshold of the biological information or sensing data obtained by the first sensor;

a detecting section configured to compare sensing data obtained by the first sensor with the threshold or the sensing data stored in the storage section to detect an abnormality and configured to use data obtained by the second sensor to determine that a user has fallen down and stayed in a fallen down state;

a communication section configured to provide communication between the space section and an acceptance management section;

an alarming section configured to cause a reporting section to issue an alarm in a case where the detecting section detects the abnormality an alarming section configured to cause a reporting section to issue an alarm in a case where the detecting section detects the abnormality and determines that the user has fallen down and stayed in a fallen down state, the alarming section being configured to report occurrence of an abnormality to the acceptance management section via the communication section;

an arrival information presenting part configured to present, to the acceptance management section and in response to an image from a camera provided at the lockable space section or GPS information of a mobile terminal possessed by an emergency staff, arrival of an emergency agency at the lockable space section, the emergency agency being dispatched in response to a dispatch request from the acceptance management section; and an unlocking part configured to carry out, in response to an unlocking request from the acceptance management section, emergency unlocking of a lock provided to the lockable space section.

5. The safety checking system as set forth in claim 4, further comprising:

a safety checking section configured to carry out, via the communication section, communication between the acceptance management section and the user so as to carry out the checking for safety.

6. The safety checking system as set forth in claim 4, further comprising:

a biological information presenting section provided in the space section that is lockable, the biological information presenting section being configured to obtain information indicative of presence or absence of the abnormality via the communication section and to present the information to the acceptance management section.

7. A safety checking system comprising:

a first sensor provided in a space section that is lockable and that allows a user or a rearing animal to go in and out, the first sensor being configured to detect biological information of the user or the rearing animal using the space section;

a second non-contact sensor that detects falling-down of the user or the rearing animal in the space section that is lockable and detects, after the falling-down, presence or absence of a motion of the user or the rearing animal having fallen down to determine if the user has stayed in a fallen down state;

a storage section configured to store at least a threshold of the biological information or sensing data obtained by the first sensor;

a detecting section configured to compare sensing data obtained by the first sensor with the threshold or the sensing data stored in the storage section to detect an abnormality and configured to use data obtained by the second sensor to determine that a user has fallen down and stayed in a fallen down state;

a communication section configured to provide communication between at least the space section and an information terminal of a watcher of the user or the rearing animal;

an alarming section configured to cause a reporting section to issue an alarm in a case where the detecting section detects the abnormality and determines that the user has fallen down and stayed in a fallen down state, the alarming section being configured to report occurrence of an abnormality to the information terminal via the communication section;

an arrival information presenting part configured to present, to the information terminal and in response to an image from a camera provided at the lockable space section, arrival of the watcher at the space section; and an unlocking part configured to carry out, in response to an unlocking request from the information terminal, emergency unlocking of a lock provided to the lockable space section, wherein.

8. A management device that is communicable with a space section via a telecommunications line, the space section being remotely lockable, said management device comprising:

an obtaining section provided in the space section that is lockable, the obtaining section being configured to obtain sensing data from a first sensor that detects biological information of a user or a rearing animal using the space section that is lockable;

a second non-contact sensor that detects falling-down of the user or the rearing animal in the space section that is lockable and detects, after the falling-down, presence or absence of a motion of the user or the rearing animal having fallen down to determine if the user has stayed in a fallen down state;

a detecting section configured to detect an abnormality on a basis of both (i) the sensing data obtained by the first sensor and (ii) biological information of the user or the rearing animal using the space section that is lockable which biological information is obtained in a normal condition or a threshold of the biological information and that the user has fallen down and stayed in a fallen down state;

an alarming section configured to cause a reporting section to issue an alarm in a case where the detecting section detects the abnormality, the reporting section being configured to report occurrence of an abnormality;

an arrival information presenting section configured to obtain, from the lockable space section via a communication section, an image captured by a camera provided in the lockable space section, wherein an acceptance management section determines whether or not a person who has arrived at the lockable space section is from the emergency agency, the emergency agency having been dispatched in response to a dispatch request from the acceptance management section of the management device; and an unlocking section configured to carry out, in response to an unlocking request from the acceptance management section, emergency unlocking of a lock provided to the space section that is lockable, wherein the obtaining section is further configured to obtain sensing data from a second sensor provided in the space section that is lockable, the second sensor being configured to detect falling-down of the user in the space section that is lockable and to detect, after the falling-down, presence or absence of a motion of the user having fallen down.

9. The management device as set forth in claim 8, further comprising:

a safety checking section configured to communicate with the user to check for safety of the user, the user using the space section that is lockable.

10. The management device as set forth in claim 8, further comprising:

a biological information presenting section configured to obtain information indicative of presence or absence of the abnormality and to present the information to the acceptance management section.

11. A management device that is communicable with a space section via a telecommunications line, the space section being remotely lockable, said management device comprising:

an obtaining section provided in the space section that is lockable, the obtaining section being configured to obtain sensing data from a first sensor that detects biological information of a user or a rearing animal using the space section that is lockable;

a second non-contact sensor that detects falling-down of the user or the rearing animal in the space section that is lockable and detects, after the falling-down, presence or absence of a motion of the user or the rearing animal having fallen down to determine if the user has stayed in a fallen down state;

a detecting section configured to detect an abnormality on a basis of both (i) the sensing data obtained by the first sensor and (ii) biological information of the user or the rearing animal using the space section that is lockable which biological information is obtained in a normal condition or a threshold of the biological information and that the user has fallen down and stayed in a fallen down state;

an alarming section configured to cause a reporting section to issue an alarm in a case where the detecting section detects the abnormality, the reporting section being configured to report occurrence of an abnormality;

an arrival information presenting section configured to present, in response to the alarm, an image captured by a camera provided in the lockable space section, said image indicative of arrival of a watcher at the space section that is lockable; and an unlocking section configured to carry out, in response to an unlocking request from an acceptance management section, emergency unlocking of a lock provided to the space section that is lockable.

12. A space section that is lockable, comprising:

a first sensor configured to detect biological information of a user or a rearing animal using the space section that is lockable;

a second sensor configured to detect falling-down of the user or the rearing animal in the space section that is lockable and to detect, after the falling-down, presence or absence of a motion of the user or the rearing animal having fallen down to determine that the user has stayed in a fallen down state;

a camera provided at or in the vicinity of a door of the lockable space section, and configured to provide an image to an acceptance management section for confirming a person who has arrived at the lockable space section is emergency staff;

a detecting section configured to determine whether or not the user or the rearing animal having fallen down moves after the falling-down on a basis of sensing data obtained by the second sensor and to detect presence or absence of an abnormality on a basis of (i) sensing data obtained by the first sensor and (ii) biological information of the user or the rearing animal having fallen down and stayed in a fallen down state which biological information is obtained in a normal condition or a threshold of the biological information; and a notifying section configured to externally notify occurrence of the abnormality in a case where the detecting section detects the abnormality.

13. A method for controlling a management device that is communicable with a space section via a telecommunications line, the space section being remotely lockable, said method comprising:

an obtaining step of obtaining sensing data from a first sensor provided in the space section that is lockable, the first sensor being configured to detect biological information of a user or a rearing animal using the space section that is lockable and obtaining sensing data from a second non-contact sensor that detects falling-down of the user or the rearing animal in the space section that is lockable and detects, after the falling-down, presence or absence of a motion of the user or the rearing animal having fallen down;

a detecting step of detecting presence or absence of an abnormality on a basis of (i) the sensing data obtained by the first sensor and (ii) biological information of the user or the rearing animal using the space section that is lockable which biological information is obtained in a normal condition or a threshold of the biological information and detecting using the second sensor that said user has stayed in a fallen down state, determining that the abnormality is present when both the significant difference between (i) the sensing data thus obtained and (ii) sensing data obtained in a normal condition or a threshold of the sensing data and the detecting that user has stayed in a fallen down state are detected;

an alarming step of causing a reporting section to issue an alarm in a case where the abnormality is detected in the detecting step, the reporting section being configured to report occurrence of an abnormality;

an arrival information presenting step of presenting an image captured by a camera provided in the lockable space section, said image indicative of arrival of an emergency agency at the space section that is lockable, the emergency agency being dispatched in response to a dispatch request from an acceptance management section of the management device; and an unlocking step of carrying out, in response to an unlocking request from the acceptance management section, emergency unlocking of a lock provided at an entrance of the space section that is lockable.

14. The method as set forth in claim 13, further comprising:

a safety checking step of communicating with the user so as to carry out the checking for safety, the user using the space section that is lockable.

15. The method as set forth in claim 13, further comprising:

a biological information presenting step of obtaining information indicative of presence or absence of the abnormality and presenting the information to the acceptance management section.

16. A method for controlling a management device that is communicable with a space section via a telecommunications line, the space section being remotely lockable, said method comprising:

an obtaining step of obtaining sensing data from a first sensor provided in the space section that is lockable, the first sensor being configured to detect biological information of a user or a rearing animal using the space section that is lockable and obtaining sensing data from a second non-contact sensor that detects falling-down of the user or the rearing animal in the space section that is lockable and detects, after the falling-down, presence or absence of a motion of the user or the rearing animal having fallen down;

a detecting step of detecting presence or absence of an abnormality on a basis of (i) the sensing data obtained by the first sensor and (ii) biological information of the user or the rearing animal using the space section that is lockable which biological information is obtained in a normal condition or a threshold of the biological information and detecting using the second sensor that said user has fallen down and stayed in a fallen down state, determining that the abnormality is present when both the significant difference between (i) the sensing data thus obtained and (ii) sensing data obtained in a normal condition or a threshold of the sensing data and the detecting that user has stayed in a fallen down state are detected;

an alarming step of causing a reporting section to issue an alarm in a case where the abnormality is detected in the detecting step, the reporting section being configured to report occurrence of an abnormality;

an arrival information presenting step of presenting, in response to the alarm, an image captured by a camera provided in the lockable space section, said image indicative of arrival of a watcher at the space section that is lockable; and an unlocking step of carrying out, in response to an unlocking request from an acceptance management section, emergency unlocking of a lock provided at an entrance of the space section that is lockable.

* * * * *